United States Patent
Chhatrapati et al.

(10) Patent No.: US 8,108,436 B2
(45) Date of Patent: Jan. 31, 2012

(54) METHOD AND APPARATUS FOR CALENDARING REMINDERS

(75) Inventors: Rupesh Chhatrapati, Sunnyvale, CA (US); Richard J. Treitel, Mountain View, CA (US); Jon Chester, Hood River, OR (US); David Sobotka, Redwood City, CA (US); Louis Lao, Oakland, CA (US); Andrew Zaeske, Los Altos, CA (US); Meera Vengadasubbu, San Jose, CA (US)

(73) Assignee: AOL Inc., Dulles, VA (US)

( * ) Notice: Subject to any disclaimer, the term of this patent is extended or adjusted under 35 U.S.C. 154(b) by 842 days.

(21) Appl. No.: 12/030,796

(22) Filed: Feb. 13, 2008

(65) Prior Publication Data

US 2008/0215691 A1 Sep. 4, 2008

Related U.S. Application Data

(62) Division of application No. 10/484,176, filed as application No. PCT/US01/26409 on Aug. 22, 2001, now Pat. No. 7,334,000.

(60) Provisional application No. 60/305,722, filed on Jul. 16, 2001.

(51) Int. Cl.
G06F 17/00 (2006.01)
G06F 7/00 (2006.01)
(52) U.S. Cl. .................. 707/796; 707/951; 705/7.18
(58) Field of Classification Search .................. None
See application file for complete search history.

(56) References Cited

U.S. PATENT DOCUMENTS

| | | | |
|---|---|---|---|
| 4,712,923 A | | 12/1987 | Martin |
| 5,813,013 A | * | 9/1998 | Shakib et al. .......... 707/999.102 |
| 5,855,006 A | | 12/1998 | Huemoeller et al. |
| 5,893,073 A | * | 4/1999 | Kasso et al. ..................... 705/8 |
| 5,931,878 A | | 8/1999 | Chapin, Jr. |
| 5,937,160 A | | 8/1999 | Davis et al. |
| 5,960,406 A | | 9/1999 | Rasansky et al. |
| 5,983,200 A | | 11/1999 | Slotznick |
| 6,016,478 A | | 1/2000 | Zhang et al. |
| 6,026,410 A | * | 2/2000 | Allen et al. ............ 707/999.104 |
| 6,029,171 A | | 2/2000 | Smiga et al. |
| 6,040,829 A | | 3/2000 | Croy et al. |
| 6,047,260 A | | 4/2000 | Levinson |
| 6,047,297 A | | 4/2000 | Johnson et al. |

(Continued)

FOREIGN PATENT DOCUMENTS

EP 811944 A2 12/1997

(Continued)

OTHER PUBLICATIONS

Morris, R.A. and L. Khatib "Quantitative Structural Temporal Constraints on Repeating Events", Florida Institute of Technology, Oct. 28, 1997.*

(Continued)

*Primary Examiner* — Kimberly Lovel
(74) *Attorney, Agent, or Firm* — Michael A. Glenn; Glenn Patent Group

(57) ABSTRACT

An electronic calendar includes such features as recurring reminders, dividing unpredictable work loads into equal pieces, template free parsing, a reminders scheduling algorithm to reduce spikes, dynamic delivery and recovery algorithms, methods for splitting the work load between controllers and workers and for monitoring progress, all within the context of a calendar architecture for a large enterprise.

2 Claims, 10 Drawing Sheets

U.S. PATENT DOCUMENTS

| | | | |
|---|---|---|---|
| 6,075,992 A | 6/2000 | Moon et al. | |
| 6,088,717 A | 7/2000 | Reed et al. | |
| 6,141,011 A * | 10/2000 | Bodnar et al. | 715/812 |
| 6,157,935 A | 12/2000 | Tran et al. | |
| 6,166,739 A | 12/2000 | Hugh | |
| 6,182,078 B1 | 1/2001 | Whitmyer, Jr. | |
| 6,232,970 B1 * | 5/2001 | Bodnar et al. | 715/708 |
| 6,310,634 B1 * | 10/2001 | Bodnar et al. | 715/854 |
| 6,681,110 B1 * | 1/2004 | Crookham et al. | 455/420 |
| 6,898,569 B1 | 5/2005 | Bansai et al. | |
| 7,146,381 B1 * | 12/2006 | Allen et al. | 707/999.104 |
| 7,302,634 B2 * | 11/2007 | Lucovsky et al. | 715/200 |
| 7,334,000 B2 * | 2/2008 | Chhatrapati et al. | 707/999.104 |
| 7,386,586 B1 * | 6/2008 | Headley et al. | 709/202 |
| 2002/0019825 A1 * | 2/2002 | Smiga et al. | 707/102 |
| 2002/0065890 A1 | 5/2002 | Barron | |
| 2002/0075291 A1 | 6/2002 | Van Gestel et al. | |
| 2003/0018724 A1 | 1/2003 | Mathewson et al. | |
| 2003/0041076 A1 * | 2/2003 | Lucovsky et al. | 707/500 |
| 2003/0131073 A1 * | 7/2003 | Lucovsky et al. | 709/219 |
| 2003/0167279 A1 * | 9/2003 | Smiga et al. | 707/102 |
| 2004/0243547 A1 * | 12/2004 | Chhatrapati et al. | 707/2 |
| 2005/0027805 A1 | 2/2005 | Aoki | |
| 2005/0154625 A1 | 7/2005 | Chua et al. | |
| 2005/0209914 A1 * | 9/2005 | Nguyen et al. | 705/14 |
| 2006/0161554 A1 * | 7/2006 | Lucovsky et al. | 707/10 |
| 2007/0083552 A1 * | 4/2007 | Allen et al. | 707/103 R |

FOREIGN PATENT DOCUMENTS

| | | |
|---|---|---|
| WO | WO 0057338 | 9/2000 |
| WO | WO 0142876 | 6/2001 |
| WO | WO 03009164 A2 | 1/2003 |

OTHER PUBLICATIONS

AppointmentQuest "AppointmentQuest Online Scheduling Application Goes Live", press release, Sep. 22, 2001.

Appointment-Plus "Scheduling Software & Appointment Scheduling Features", downloaded from website—appointment.plus.com/features.php, 2006.

AppointmentQuest "Online Appointment Manager", product brochure, Mar. 2001.

Holthaus, O. "Design of Efficient Job Shop Scheduling Rules", Proceedings of the 21$^{st}$ International Conference on Computers and Industrial Engineering, vol. 33, Nos. 1-2, pp. 249-252, 1997.

Liu, K-C. Dispatching Rules for Stochastic Finite Capacity Scheduling, Proceedings of the 22$^{nd}$ International Conference on Computers and Industrial Engineering, vol. 35, Nos. 1-2, pp. 113-116. 1998.

Marinho, J., A. Braganca and C. Ramos "Decision Support System for Dynamic Production Scheduling", Proceedings of the 1999 IEEE International Symposium on Assembly and Task Planning, pp. 424-429, Jul. 1999.

Lawler, E.L. "Scheduling a Single Machine to Minimize the Number of Late Jobs", Technical Report No. UCB/CSD-83-139, University of California, Berkeley, EECS Department, 1983.

Brucker, P. and M.Y. Kovalyov "Single Machine Batch Scheduling to Minimize the Weighted Number of Late Jobs", Mathematical Methods of Operations Research, vol. 43, pp. 1-8, 1996.

Pierreval, H. and N. Mebarki Dynamic Selection of Dispatching Rules for Manufacturing System Scheduling:, International Journal of Production Research, vol. 35, No. 6, pp. 1575-1591, 1997.

Holthaus, O. and C. Rajendran "Efficient Dispatching Rules for Scheduling in a Job Shop", International Journal of Production Research, vol. 48, pp. 87-105, 1997.

Annamalai, Melliy, et al., "Indexing Images in Oracle8i", 2000 ACM Sigmod, International Conference on Management of Data, Dallas, TX, USA, May 16-18, 2000, pp. 539-547, Jun. 2000, ISSN: 0163-5808.

Christodoulakis, Stavros, et al., "Design Considerations for a Message File Server", 8198 IEEE Transactions on Software Engineering, SE-10 Mar. 1984, No. 2, pp. 201-202, New York, USA.

Bauer, A., B. Bullnheimer, R.F. Harti and C. Strauss Minimizing Total Tardiness on a Single Machine Using Ant Colony Optimization, Central European Journal of Operations Research, vol. 8, No. 2, pp. 125-141, 2000.

Sourd, F. and S. Kedad-Sidhoum "An Efficient Algorithm for the Earliness-Tardiness Scheduling Problem", Working Paper, LIP6, downloaded from website—optimization-online.org/DB_HTML/2005/09/1205.html.

"2,001 Tips: Applications—Got a hectic schedule? Juggling multiple projects? These tips will help you keep it all under control", Windows Magazine, n911A, Nov. 1998, p. 83.

"Add-ons aid productivity, provide workgroup functions", PC Sources, vol. 3, No. 11, Nov. 1992, 2 pages.

"An appointment calendar for Windows 95", PC Magazine, vol. 15, No. 5, Mar. 12, 1996, pp. 269-272.

"Organize Online", PC Magazine, ISSN: 0888-8507, Mar. 9, 1999, p. 9.

"We Have Mail", C/C++ Users Journal, vol. 14, No. 6, Letter to the Editor, Jun. 1996, pp. 90-93.

Albinus, Philip, "Hire a software secretary", Home Office Computing, vol. 15, No. 2, Feb. 1997, p. 93.

Alesandrini, Kathryn, "No more information overload: PIMs put an end to the paper chase", Computer Shopper, vol. 16, No. 2, Feb. 1996, p. 542.

Berlind, David, "Philippe Kahn: the comeback kid?", PC Week, vol. 13, No. 1, Jan. 8, 1996, p. 66.

Bertolucci, et al., "Beyond Free-Mail", PC World, vol. 18, No. 4, Apr. 2000, p. 151.

Boyce, Jim, "Web-Wise PIMs—Personal information managers are adding Internet capabilities to their long lists of features", Windows Magazine, No. 805, May 1997, p. 212.

Dennis, Donnette, "Contact management often poses quandary", Computer Reseller News, ISSN: 0893-8377, Dec. 6, 1999, p. 127.

Durkin, Tom "Scheduling Tasks Eased by Net-Based Solution", Telecommuting Review: the Gordon Report, vol. 13, No. 5, May 1996, p. 13.

Elliot, Elaine X., "Collaborative computing", Computer Shopper, vol. 16, No. 6, Jun. 1996, p. 534.

Elliott, Elaine X., "Order from chaos", Computer Shopper, vol. 17, No. 2, Feb. 1997, p. 316.

English, David, "Shareware Shop: Organize the details of your life", Computer Shopper, ISSN: 0886-0556, Jan. 1999, p. 456.

Ginsburg, Lynn, "Pixel Me in—Free Web-based calendars give you and your colleagues anytime, anywhere access to your schedule", Computer Shopper, ISSN: 0886-0556, Sep. 1, 2000, p. 233.

Harter, Betsy, "Informance Performance", Wireless Review, ISSN 1099-9248, Mar. 1, 2000, 3 pages.

Kramer, Matt, "Timely updates for two scheduler: OnTime widens Web linds, caLANdar packs in PIM features", PC Week, vol. 13, No. 49, Dec. 9, 1996, pp. 8081.

Lang, Nancy A., "Web Rendezvous Part Deux", Windows Magazine, No. 1004, Apr. 1999, p. 148.

Negrino, Tom, "Claris Organizer 2.0", Macworld, vol. 14, No. 1, Jan. 1997, p. 62.

Niz, Xavier W., "So Long, Shrink-Wrap—With the Internet offering everything from calendars to calculators, it's destined to become the vehicle by which all your applications are delivered", Computer Shopper; ISSN: 0886-0556, Aug. 1, 2000, p. 182.

Pack, Thomas, "Online calendar keeps you organized", Link-Up, vol. 17, No. 1, Jan. 2000, p. 30.

Powell, James E., "Power PIMs Strut Their Stuff", Windows Magazine, Aug. 1, 1995, p. 258.

Tam, Sun Ying, "Getting organized with Microsoft Outlook 97", Home PC No. 412, Dec. 1997, p. 185.

Walker, Christy, "Vendors enhance calendar, messaging software options", PC Week, vol. 14, No. 48, Nov. 17, 1997, p. 15.

Woods, Wendy, "Supercalendar", Newsbytes News Network, Feb. 22, 2000, 1 page.

* cited by examiner

*FIG. 4*

⚠ Little Sammy's Birthday

Subject: Little Sammy's Brithday
Date: Sun, 6/2500 5:05 PM Pacific Daylight Time
From: My Calendar
To: John McSmith This event is coming up in <u>1 week</u>:

   Event:          Little Sammy's Birthday
       Date and Time:  Sun, July 2, 2000 5:00 PM Pacific
       Notes:          Remember to get him Hot Wheels.

Need a gift?

Shop@AOL's <u>Quick Gifts</u> delivers within 48 hours!

Make sure you check out <u>RedEnvelope</u> where some o original gift selections are made available to you. Key You can also send a FREE personalized Birthday wish minute through the <u>American Greetings</u> Shop!

   <u>Snooze.</u>  Please remind me again about this event lat
       <u>Launch myCalendar.</u>  I'd like to change this event.

[ Delete ]

*FIG. 7*

METHOD AND APPARATUS FOR CALENDARING REMINDERS

CROSS REFERENCE TO RELATED APPLICATIONS

This application is a division of U.S. patent application Ser. No. 10/484,176, filed Jun. 24, 2004, now U.S. Pat. No. 7,334,000 which is a national stage entry of PCT/US01/26409, filed Aug. 22, 2001, which claims benefit of U.S. provisional patent application No. 60/305,722, filed Jul. 16, 2001.

BACKGROUND OF THE INVENTION

The invention relates to the setting and triggering of reminders. More particularly, the invention relates to a method and apparatus for calendaring reminders.

DESCRIPTION OF THE PRIOR ART

Various Calendaring and associated reminder systems are known. See, for example:

M. Huemoeller, J. Arvada, W. Huemoeller, Personal Activity Scheduling Apparatus, U.S. Pat. No. 5,855,006 (Dec. 29, 1998) (The personal activity scheduling system accesses data from various sources to provide the user with information that is required to enable the user to conveniently and expeditiously schedule activities without requiring access to other sources of information. The personal activity scheduling system can include schedules of various sports activities, cultural events, birthdays and anniversaries, professional meetings and deadlines, and any other temporally based items of interest to the particular individual. Each of these temporally based activities can be associated with data representative of information required by the user to schedule an activity from the list of potential activities into the individual's personal calendar as well as make reservations and ticket purchases using this system.);

S. Chapin, Jr., Computerized Prompting Systems, U.S. Pat. No. 5,931,878 (Aug. 3, 1999) (A computerized prompting system is especially useful for vehicular maintenance and includes a Level of maintenance database with task schedules for selected vehicles and prompt frequencies for those tasks. A prompter initiates a display informing the user that a scheduled maintenance is due to be performed on a selected date and an Internet exchange connects the database to a service center. The system has a capability to print coupons and to receive and incorporate updates from manufacturers.); and R. Rasansky, L. Denton, III, B, Cynwyd, R. Morris, Scheduling System For Use Between Users On The Web, U.S. Pat. No. 5,960,406 (Sep. 28, 1999) (A computer system for scheduling events between end users of the system. Each end user is granted a unique password protected personal calendar. This calendar is generated from information stored in a database at a central server, and delivered to each end user as standard HTML sent through the Internet. This custom personal calendar is then viewed by the end user in a standard Web Browser. This obviates the need for special software programs to be purchased by end users, and also allows end users of any CPU type to read their calendars. When an end user uses the system to send an Invitation or Announcement to others on the system, the sending end user has the option of sending Email in addition to posting that information in the calendars' of others. When an end user sends an Invitation or Announcement to a person who is not an Appointnet user, then the Appointnet system automatically creates a unique calendar for the recipient, and sends and Email to that person.

Individuals who use the present system can post reminders to themselves, send announcements to people they know, and make appointments with people they know. When these messages are sent, the communications is nearly instantaneous because the system makes one record and allows both (or many) parties to view it.).

While such systems as are known are useful, they are not specifically adapted for use in large enterprises where the scheduling and execution of such events as reminders must be balanced against system capacity and bandwidth for several types of events having various levels of urgency.

It would be advantageous to provide an electronic calendar that includes such features as recurring reminders, the ability to divide unpredictable workloads into equal pieces, a templatized content management system that uses pre-parsing for efficiency, a scheduling algorithm that reduces transient spikes in delivery volume, dynamic delivery and recovery algorithms, methods for splitting and coordinating the delivery workload across several computers, all within the context of a calendar architecture for supporting a large enterprise.

SUMMARY OF THE INVENTION

The presently preferred embodiment of the invention provides an electronic calendar that includes such features as recurring reminders, dividing unpredictable work loads into equal pieces, template pre-parsing, a reminders scheduling algorithm to reduce spikes, dynamic delivery and recovery algorithms, and methods for splitting the work load between controllers and workers and for monitoring progress, all within the context of a calendar architecture for supporting a large enterprise, such as AmericaOnLine (AOL) of Dulles, Va.

One aspect of the invention provides optimized recurring reminders database queries.

Two standard methods of handling recurring reminders are:

1. Expand the recurrence and store the reminders as single occurrence reminders; and
2. Read all recurring reminders and see which ones occur during a particular time span.

Method 1 above occurs when a reminder is entered into a database and method 2 occurs when reminders are retrieved from the database.

Method 1 has two at least major drawbacks:
Any changes require large amounts of database activity; and
How far into the future to expand the recurrence is unknown.

Method 2 has at least one major drawback:
Reading every recurring reminder is a very database intensive task.

One aspect of the invention provides a third method of handling recurring reminders:

3. Store a probability hint with each recurring reminder.

The hint is used to optimize the number of recurring reminders that must be accessed to find all reminders to be sent during a time period. The hint, in conjunction with the time period, greatly reduces the number of false hits against the database. The hint heuristic is specific to each recurrence type, e.g. weekly, monthly, etc. During the queuing process each recurring reminder has a hint attached.

Another aspect of the invention provides a method for dividing an unpredictable workload into equal pieces.

This aspect of the invention applies to a service, such as the AOL Reminders service, where clients can request actions to be taken in specific time frames, but nothing is known in advance about the details of such actions. Mechanisms are provided whereby clients may specify these details, such as user ID and time of reminder, when requesting an action, but it is not known whether, for example, some user IDs appear much more frequently than others.

When the entire workload of such a service is large enough to require the use of several devices working in parallel, it is important to divide up the actions that must be taken during a given time frame into groups of equal size and to distribute these groups in parallel across a set of devices, so that the number of actions to be taken by each device does not exceed the device's throughput capacity within such time frame. But the details specified by the clients may not furnish the basis for any such equal division. This division is achieved by attaching a label to the description of each action, in addition to all details specified by the client and independent therefrom, at the time when the request for action is received from the client, in such a fashion that all possible labels appear with equal frequency. Actions to be taken in a given time frame can then be grouped according the labels attached to them, and it is assured that these groups are of equal size.

Another aspect of the invention comprises a reminders service that delivers messages that are composed of two parts, i.e. standard reminder content such as branding and message formatting, and event-specific content such as the title of the event, the user's notes about the event, etc. To meet performance goals, the reminders service must minimize the amount of per-reminder work it performs, and must perform as much of the work as possible local to the machine, i.e. with little or no inter-process, disk, network, or database interaction on a per-reminder basis.

One of the key performance optimizations provided by the invention occurs with regard to the way standard reminder content is handled. All standard content for reminders is stored in a set of template files. The template file specifies the standard content for the reminder, and includes a set of directives within the template indicating where the substitution of event-specific content should occur. At runtime, template files are loaded into a cache in a lazy fashion, i.e. when they are first needed.

When the template is first loaded into memory, it is pre-parsed, or 'freeze-dried.' This involves dissecting the template into an array of hard coded string constants and variable names. The process of assembling the final reminder content is therefore reduced to walking the freeze-dried array once. String constants are appended to the final message content, and template variable names are used as a lookup into the dictionary of key-value pairs of event data for this particular reminder. This approach radically reduces the amount of CPU time required to assemble the final message content.

The invention also comprises a reminders scheduling algorithm for reducing spikes in delivery volume. One inherent difficulty in delivering reminders to millions of users is that the distribution of the reminder delivery times is extremely uneven, e.g. meetings, social activity, events of all types generally start on the hour or on the half-hour, while few users set reminders for 8:07 am. This is exacerbated by the fact that users are generally most active during a subset of each 24-hour period—business hours on Monday-Friday, for instance, or (worse yet) lunchtime, e.g. 11-2 pm. The user base is distributed across several time zones, and this does help to scatter the traffic somewhat, but with only a three hour spread across the U.S. the improvement is only marginal—9 am Monday morning PST is Noon EST—both extremely busy times for users of the reminders service. This clustering of user activity creates hotspots in the delivery schedule, i.e. times where the number of reminders to be delivered momentarily exceeds the throughput of the system.

To ensure robust and predictable reminder delivery, the reminders service must spread the load of reminder delivery across time as evenly as possible without delivering reminders too late or too early. The reminders service weighs several factors in deciding when to schedule a reminder for delivery. Fundamental to the approach are two things:

The intent of the user; and

The destination device.

The intent of the user is inferred by examining the lead time of the reminder. Lead time is defined as the difference between the time an event occurs and the time for which the reminder for that event occurs. For instance, an event at 9:00 am with a reminder at 8:45 am has a lead time of 15 minutes; an event on September $12^{th}$ with a reminder on September $5^{th}$ has a lead time of one week.

A key assumption made by the reminders service is that the longer the lead time for the reminder, the less accuracy is required in its delivery. To illustrate with the examples above, the reminder with a lead time of 15 minutes has likely been set by a user to remind themselves to take immediate action upon receipt of the reminder—to attend a 9:00 am meeting, for instance. By contrast, a reminder with the lead time of one week suggests that the user must take some action in the near term (preparing for a meeting that is one week away, for instance), but the delivery accuracy of reminder with the one week lead time is much less critical. Delivering the 15-minute lead time reminder an hour early is bad—the user set the reminder with the assumption that they would be reminded of the event just when they need to act upon it. Late delivery is worse—the user may miss their meeting. For the one week lead time reminder, though, delivering the reminder an hour in advance is acceptable—the general intent of the user to receive a reminder about a week before the event.

This approach is implemented in the reminders service by assigning each reminder to a priority class based on the lead time of the reminder. Reminders with a lead time of less than one hour all fall into one priority class, for instance, and reminders with a lead time of over one week fall into another. In the presently preferred embodiment of the invention, there are four priority classes in all. Each priority class has a delivery window during which the reminders of that class may be delivered. The size of the window varies according to the urgency of the priority class, and it is measured backwards from the ideal delivery time.

The delivery window for reminders with a lead time of less than one hour is ten minutes, which can be read as follows:

For a reminder with an ideal delivery time of 8:45 am that has a lead time of 15 minutes, i.e. it is a reminder for an event at 9 am, the acceptable delivery window is from 8:35 am-8:45 am. The delivery window is allowed to be much larger for reminders with long lead times—for a reminder with an ideal delivery time of 9:00 am September $5^{th}$ that has a lead time of one week, the acceptable delivery window is from 6:00 am-9:00 am September $5^{th}$.

Clustering reminders into different priority classes allows the service to smooth the spikes in reminder delivery. During a peak time such as 9:00 am PST the majority of reminders for 9:00 am will have been delivered in the hours previous, with extremely long lead time reminders being delivered several hours earlier. Short lead time reminders are still delivered close to 9:00 am, because the user intent with short lead times is to be reminded in an accurate manner close to the actual event time.

This delivery algorithm is further complicated by the notion that not all delivery destinations are ideal for less-accurate delivery.

The service supports delivery to email and cellular telephone destinations. If a user creates an email reminder with a one week lead time for 6:00 am Monday morning, it is quite acceptable to deliver the email reminder to the user's mailbox at 3:00 am. This is completely untrue for cellular telephone reminders—messaging to a cellular telephone at 3:00 am is likely to be unwanted by the user. For this reason, the size of the delivery window is drawn from a matrix of priority class and lead time. Reminders to email destinations are delivered much less accurately as their lead time increases, while delivery to pagers and cellular telephones maintains a short delivery window even for long lead time reminders, because the nature of the device requires more accurate delivery.

The invention also comprises a reminders dynamic delivery/recovery algorithm. Once a reminder has been scheduled using the algorithm described above, it is a candidate for delivery. The term 'candidate' is used to indicate that the actual delivery may not start as soon as the reminder has been scheduled for delivery.

Instead, a dynamic prioritization scheme is used to determine which of the candidate reminders to deliver. It is assumed that at certain times the number of reminders to be delivered exceed the delivery capacity of the system. This may occur at peak system usage times as discussed above, and may also occur after a scheduled or unscheduled system outage, when there is a large backlog of undelivered reminders that must be processed. At these times the system must choose to deliver some reminders while others are forced to wait until capacity becomes available. This choice is accomplished with a dynamic priority queue.

As mentioned above, reminders with similar delivery properties, e.g. same priority class, same delivery destination device (email vs. pager, etc.), are grouped into units of work, called jobs. The salient point about a job is that the reminders in one job can be scheduled as one entity. Every minute the service assesses the amount of available delivery capacity, and starts delivery of new jobs from the head of the queue until the queue is empty or delivery capacity is exhausted. During the next minute some currently-running jobs complete (freeing up delivery capacity) and other new jobs are added into the queue. The service then repeats the process of selecting new jobs to be started.

The main task of the dynamic delivery algorithm is to ensure that reminders are not delivered too late. The scheduling algorithm already ensures that reminders are not delivered too early by not adding the reminders to the delivery candidate queue until their delivery window has opened. The secondary task of the dynamic delivery algorithm is to ensure that the queue is as short as possible at all times, while ensuring that reminders whose delivery window has just opened, i.e. they have just become candidates for delivery, remain on time.

Jobs in the queue are prioritized by their delivery urgency, defined as follows:

Jobs that are not yet late are always preferred over jobs that are late;
For jobs that are not late, the closer to late they are, the more urgent they become;
For jobs that are already late, the less late they are, the more urgent they become;
In the event of a tie, prefer the job with the smallest delivery window, i.e. the smaller lead time.

This algorithm has several distinct advantages. Jobs which have less accurate delivery requirements are delivered earlier, offloading the system during peak times. Under heavy system load, less urgent jobs may pile up in the delivery queue; they are delivered as soon as load diminishes. Even during heavy load the algorithm attempts to keep new jobs on time. As soon as load diminishes, the algorithm attempts to clear the backlog as quickly as possible. The length of the queue at any given time is a good barometer of the overall health of the system.

Compiling a histogram of the queue length over a period of time gives a good indication of capacity requirements, volume spikes etc. The algorithm has one less-than-ideal property—under light and normal loads, it favors delivering reminders as early as possible, i.e. as soon as the delivery window opens, rather than as close as possible to the requested time. This is an inevitable trade-off: the harder you try to avoid being early, the less safety margin you have and the more you risk being late if anything goes wrong. The preferred bias in the reminders service is to try and confine the risk of late delivery to major hardware or software failures.

The invention also comprises a mechanism for splitting the workload using controller-workers and monitoring their progress. This applies to a service, such as a reminders service, which is required to execute a large workload at a specific time that exceeds the delivery capacity of a single machine, and finish the workload within a small period of time. Mechanisms are provided whereby a process, known as a controller starts a unit of work, known as a job, as a new process, called a worker, on a different machine, i.e. the worker machine. The mechanism allows the system to distribute the work evenly, across all of the worker machines, taking into account their capacity and current load.

The controller divides a large job into smaller jobs by grouping the records within the large jobs by a distribution ID, which in the preferred embodiment is a number between 0 to 127 that is randomly assigned to the record upon its creation, and by assigning a range of distribution IDs to a job.

The mechanism also allows the system to add new worker machines on the fly, and the controller starts assigning new work on the new machine to meet heavy loads. On the other hand, should a worker machine fail or need to be taken down, then the mechanism allows the system to remove the worker machine on the fly, and the controller does not start any new work on that machine.

The worker starts executing the job that is sorted by the distribution ID and keeps on updating the controller at a regular interval with its progress, measured in terms of the distribution ID. If the worker fails to complete the Job, then the controller has a way of identifying the failure and restarting a new job that only does work that was not completed by the previous worker, thereby reducing the redundant work.

To safeguard against any single point of failure, the mechanism allows running of a backup controller which monitors the primary controller and takes charge when the primary is not able to do its job.

BRIEF DESCRIPTION OF THE DRAWINGS

FIG. 4 is a screen display showing a reminders user interface dialog according to the invention;

FIG. 7 shows a display that provides a resulting reminder according to the invention;

DETAILED DESCRIPTION OF THE INVENTION

Figure 1:
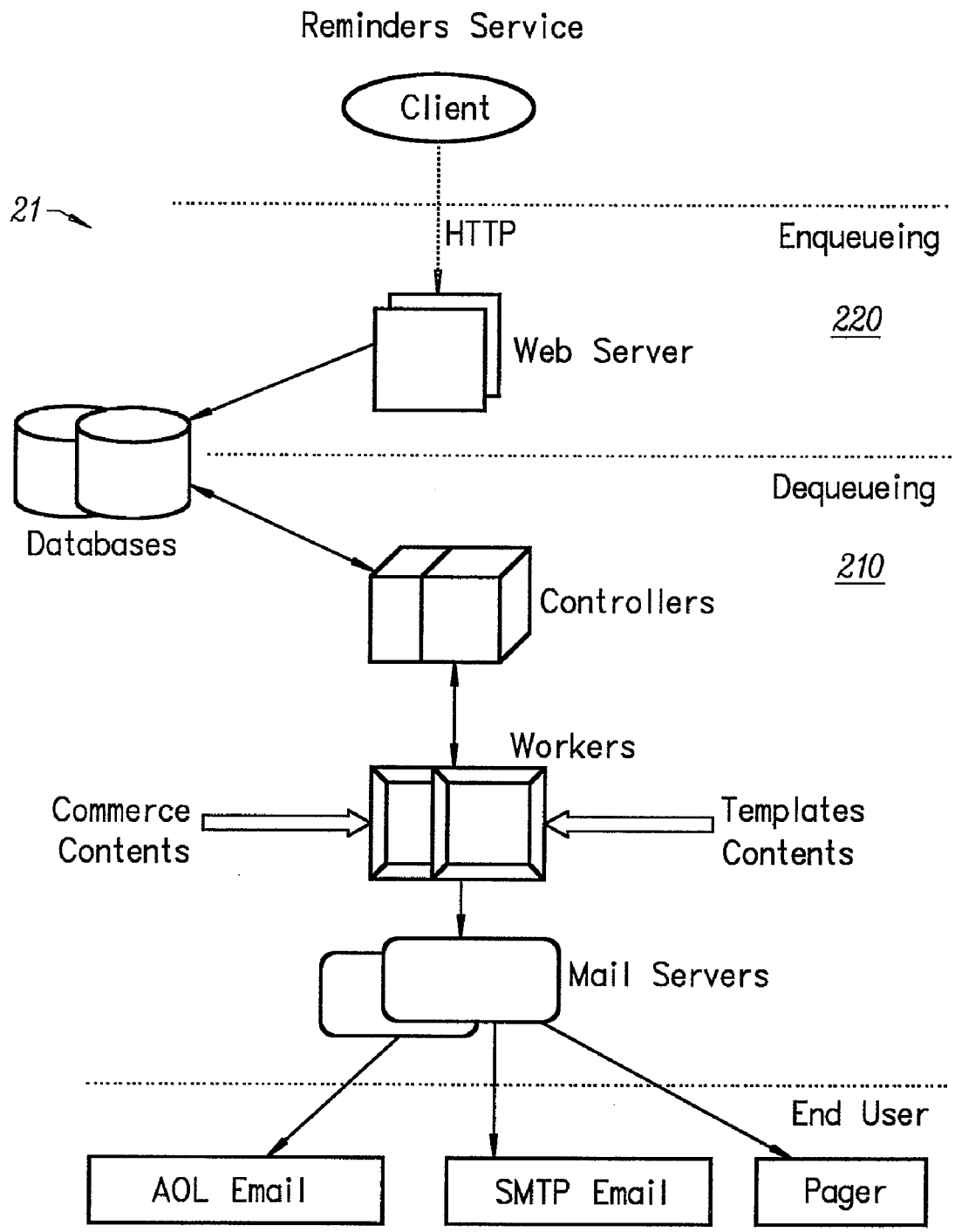
FIG. 1 is a block schematic diagram that details the workflow from enqueuing single/multiple events into a reminders service to delivery of the reminder to the end user according to the invention.
Figure 2:
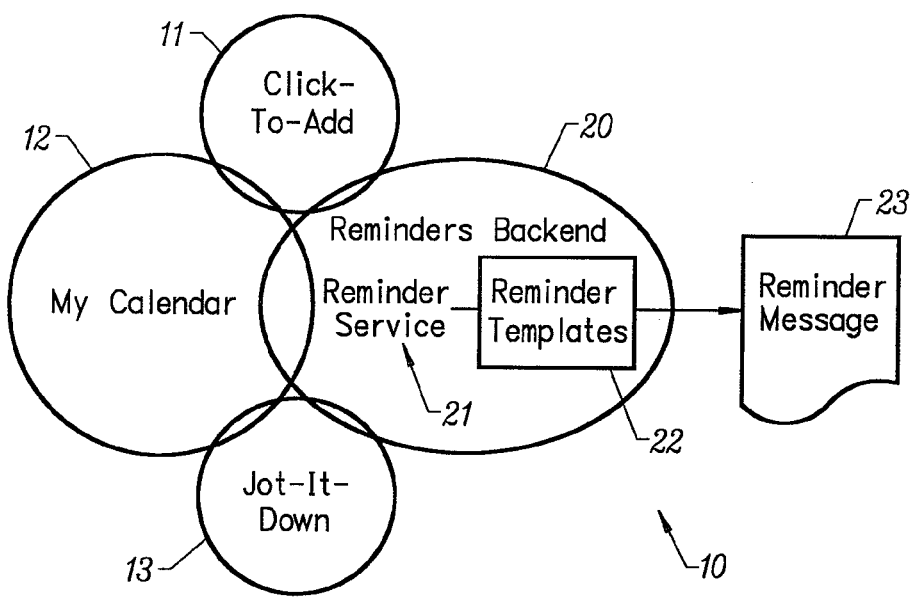
FIG. 2 is a block schematic diagram that shows the features of a reminder system according to the invention.

FIG. 1 is a block schematic diagram that details the workflow from enqueuing single/multiple events into a reminders service to delivery of the reminder to the end user according to the invention; FIG. 2 is a block schematic diagram that shows the features of an enterprise-wide Calendaring system that includes a reminder system according to the invention. The system 10 comprises various enterprise applications, such as Click-To-Add 11, My Calendar 12, and Jot-It-Down 13. The server side portion of the invention is provided in a reminders backend 20 that includes both a reminders service 21 and a mechanism for the creation and application of reminder templates 22. The reminders backend outputs reminder messages 23.

The presently preferred embodiment of the invention provides an electronic calendar that comprises such features as recurring reminders, dividing unpredictable work loads into equal pieces, template free parsing, a reminders scheduling algorithm to reduce spikes, dynamic delivery and recovery algorithms, methods for splitting the work load between controllers and workers and for monitoring progress, all within the context of a calendar architecture for a large enterprise.

The following features are implemented by the invention in connection with the exemplary embodiment, discussed below:

Optimized Recurring Reminders Database Queries

Two standard methods of handling recurring reminders are:

1. Expand the recurrence and store the reminders as single occurrence reminders; and
2. Read all recurring reminders and see which ones occur during a particular time span.

Method 1 has at least two major drawbacks:

Any changes require large amounts of database activity; and

How far into the future to expand the recurrence is unknown.

Method 2 has at least one major drawback:

Reading every recurring reminder is a very database intensive task.

This aspect of the invention provides a third method of handling recurring reminders.

3. Store a probability hint with each recurring reminder.

The hint is used to optimize the number of recurring reminders that must be accessed to find all reminders to be sent during a time period. The hint, in conjunction with the time period, greatly reduces the number of false hits against the database.

The hint heuristic is specific to each recurrence type (weekly, monthly, etc.). During the queuing process each recurring reminder has a hint attached. Because the hint is only a hint the dequeuing process must still determine if the reminder should be sent.

A Method for Dividing an Unpredictable Workload into Equal Pieces

This aspect of the invention applies to a service, such as a reminders service, where clients can request actions to be taken in specific time frames, where nothing is known in advance about the details of such actions. Mechanisms are provided whereby clients may specify these details, such as user ID and time of reminder, when requesting an action, but it is not known whether (for example) some user IDs appear much more frequently than others.

When the entire workload of such a service is large enough to require the use of several devices working in parallel, it is important to divide up the actions that must be taken during a given time frame into groups of equal size, so that each group can be assigned to one device and the number of actions to be taken by such device is no greater than such device can take within such time frame. But the details specified by the clients do not furnish the basis for any such equal division. This division is achieved by attaching to the description of each action a label, additional to all details specified by the client an independent therefrom, at the time when the request for action is received from the client, in such a fashion that all possible labels appear with equal frequency. Actions to be taken in a given time frame can then be grouped according the labels attached to them, and it is assured that these groups are of equal size.

A Mechanism for Splitting the Workload using Controller-Workers and Monitoring the Progress This aspect of the invention applies to a service, such as the reminders service disclosed herein, which is required to execute a large workload at a specific time and finish it within a small period of time. Mechanisms are provided whereby a process, known as a controller starts a unit of work, known as a job, as a new process, called a worker, on a different machine, i.e. a worker machine.

The mechanism allows the system to distribute the work evenly across all the worker machines depending upon their capacity and current usage. The controller divides a large job into smaller jobs by grouping the records within the large jobs by a distribution ID, i.e. a number between 0 to 127 that is randomly assigned to the record upon its creation, and assigning a range of distribution IDs to a job.

The mechanism also allows the system to add a new worker machine on the fly, where the controller starts assigning new work on the new machine, to meet heavy loads. On the other hand, should a worker machine fail or need to be taken down, then the mechanism allows the system to remove the worker machine on the fly, and the controller does not start any new work on that machine.

The worker starts executing the job that is sorted by the distribution ID and keeps on updating the controller at a regular interval with its progress, measured in terms of the distribution ID. If the worker fails to complete the job, then the controller has a way of identifying the failure and restarting a new job that only does the work that was not completed by the previous worker, thereby reducing the redundant work.

To safeguard against any single point of failure, the mechanism allows the system to run a backup controller which keeps an eye on the primary controller and takes charge when the primary is not able to do its job.

Reminders Template Pre-parsing

The reminders service delivers messages that are composed of two parts, i.e. reminder templates that contain standard content such as branding and message formatting, and event-specific content such as the title of the event, the user's notes about the event, etc. Delivering a reminder involves merging these parts together to form the final reminder content. To meet performance goals, the reminders service must minimize the amount of per-reminder work it performs, and must perform as much of the work as possible local to the machine, i.e. with few or no network or database interaction on a per-reminder basis.

One of the key performance optimizations provided by the invention occurs in the way standard reminder content is handled. All standard content for reminders is stored in a set of template files. The template file specifies the standard content for the reminder, and includes a set of directives indicating where the substitution of event-specific content should occur.

At runtime, template files are loaded into a cache in a lazy fashion, i.e. when they are first needed. The service has been designed such that although many processes are involved to parallelize the delivery of reminders, each delivery or worker process performs a set of work that requires only a small subset of the available templates.

When the template is first loaded into memory, it is pre-parsed, or 'freeze-dried'. This involves dissecting the template into an array of hard coded string constants and variable names. The process of assembling the final reminder content is then reduced to walking the freeze-dried array once. String constants are appended to the final message content, and template variable names are used as a lookup into the dictionary of key-value pairs for this particular reminder.

This approach radically reduces the amount of CPU time required to assemble the final message content.

Reminders Scheduling Algorithm to Reduce Spikes in Delivery Volume

The inherent difficulty in delivering reminders to millions of users is that the distribution of the reminder delivery times is extremely uneven, e.g. meetings, social activity, events of all types generally start on the hour or on the half-hour, and few users set reminders for 8:07 am. This is exacerbated by the fact that users are generally most active during a subset of each 24 hour period—business hours on Monday-Friday, for instance, or (worse yet) "lunchtime", e.g. 11-2 pm.

The user base is distributed across several time zones, and this does help to scatter the traffic somewhat, but with only a three hour spread across the U.S. the improvement is marginal—9 am Monday morning PST is Noon EST—both extremely busy times for the reminders service. This creates hotspots in the delivery schedule, times where the number of reminders to be delivered momentarily exceeds the throughput of the system. To ensure robust and predictable reminder delivery, the reminders service must spread the load of reminder delivery across time, yet not deliver reminders too late or too early.

The reminders service weighs several factors in deciding when to schedule a reminder for delivery. Fundamental to the approach are two things:

The intent of the user; and
The destination device.

The intent of the user is inferred by examining the lead time of the reminder. Lead time is defined as the difference between the time an event occurs and the time for which the reminder for that event occurs. For instance, an event at 9:00 am with a reminder at 8:45 am has a lead time of 15 minutes; an event on September $12^{th}$ with a reminder on September $5^{th}$ has a lead time of one week. One key assumption made by the reminders service is that the shorter the lead time for the reminder, the less accuracy is required in its delivery. To illustrate with the examples above, the reminder with a lead time of 15 minutes has likely been set by a user to remind themselves to take immediate action upon receipt of the reminder—to attend the 9:00 am meeting, for instance. By contrast, a reminder with the lead time of one week suggests that the user must take some action in the near term (prepare for a meeting that is one week away, for instance), but the delivery accuracy of reminder with the one week lead time is much less critical. Delivering the 15-minute lead time reminder an hour early is bad—the user set the reminder up with the assumption that they would be reminded of the event just as they needed to act upon it—and delivering it late is extremely bad—the user just missed their meeting. For the one week lead time reminder, though, delivering the reminder an hour is acceptable—the general intent of the user to receive a reminder about a week before the event.

This approach is implemented in the reminders service by assigning each reminder to a priority class based on the lead time of the reminder. Reminders with a lead time of less than one hour all fall into one priority class, for instance, and reminders with a lead time of over one week fall into another. There are four priority classes in all.

Each priority class has a delivery window during which the reminders of that class may be delivered. The size of the window varies according to the urgency of the priority class, and it is measured backwards from the ideal delivery time. The delivery window for reminders with a lead time of less than one hour is ten minutes, which can be read as follows: For a reminder with an ideal delivery time of 8:45 am that has a lead time of 15 minutes, i.e. it is a reminder for an event at 9 am, the acceptable delivery window is from 8:35 am-8:45 am. The delivery window is much larger for reminders with long lead times—for a reminder with an ideal delivery time of 9:00 am September $5^{th}$ that has a lead time of one week, the acceptable delivery window is from 6:00 am-9:00 am September $5^{th}$.

Clustering reminders into different priority classes allows the service to smooth the spikes in reminder delivery radically. During a peak time such as 9:00 am PST the majority of reminders for 9:00 am are delivered in the hours previous—with extremely long lead time reminders being delivered several hours earlier. The short lead time reminders are still delivered close to 9:00 am because the user intent with short lead times is to be reminded in an accurate manner close to the actual event time.

This delivery algorithm is further complicated by the notion that not all delivery destinations are ideal for less accurate delivery. The service supports delivery to email and cellular telephone destinations. If a user creates an email reminder with a one week lead time for 6:00 am Monday morning, it is quite acceptable to deliver the email reminder to the user's mailbox at 3:00 am. This is completely untrue for cellular telephone reminders—messaging to a cellular telephone at 3:00 am is likely to be unwanted by the user. For this reason the size of the delivery window is drawn from a matrix of priority class and lead time. Reminders to email destinations are delivered much less accurately as their lead time increases, while delivery to pagers and cellular telephones maintains a short delivery window even for long lead time reminders, since the nature of the device requires more accurate delivery.

Reminders Dynamic Delivery/Recovery Algorithm

Once a reminder has been scheduled using the algorithm described above, it is a candidate for delivery. The term candidate is used to indicate that the actual delivery may not start as soon as the reminder has been scheduled. Instead, a dynamic prioritization scheme is used to determine which reminders to deliver. It is assumed that at certain times the number of reminders to be delivered exceeds the delivery capacity of the system. This may occur at peak system usage times as discussed above, and may also occur after a scheduled or unscheduled system outage, when there is a large backlog of undelivered reminders that must be processed.

At these times the system must elect to deliver some reminders while others are forced to wait until capacity becomes available. This is accomplished with a dynamic priority queue. As mentioned above, reminders with similar delivery properties—same priority class, same delivery destination device (email vs. pager etc.)—are grouped into units of work, called jobs. The salient point about a job is that the reminders in one job can be scheduled as one entity.

Every minute the service assesses the amount of available delivery capacity, and starts delivery of new jobs from the head of the queue until the queue is empty or delivery capacity is exhausted. During the next minute some currently running jobs complete (freeing up delivery capacity) and other new jobs are added into the queue. The service then repeats the process of selecting new jobs to be started.

Figure 3:
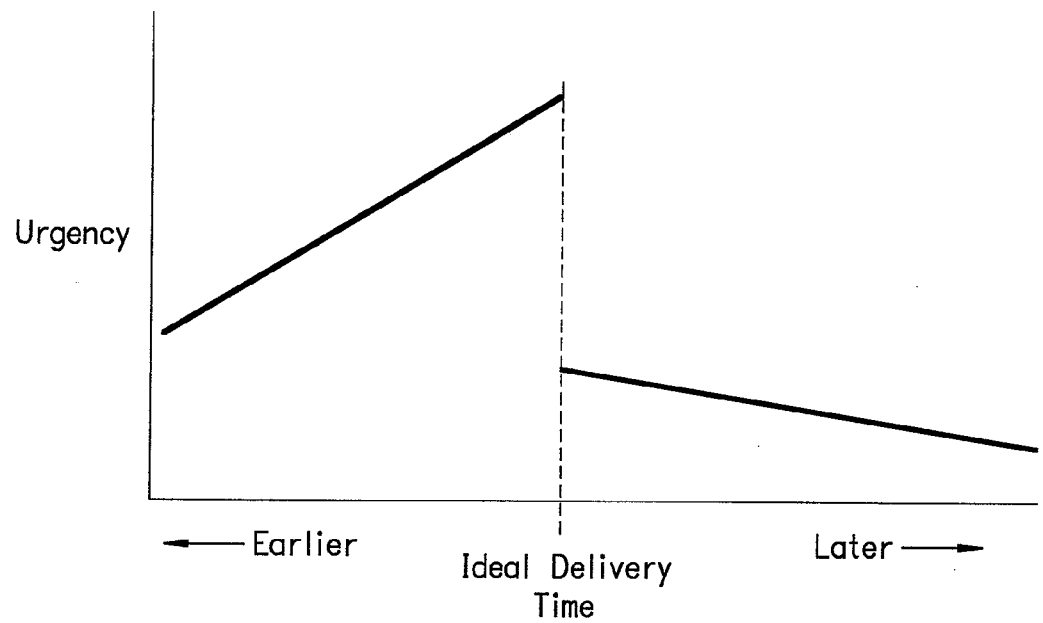
FIG. 3 is a graph which shows jobs in a queue that are prioritized by their delivery urgency.

The task of the dynamic delivery algorithm is to ensure that reminders are not delivered too late. The scheduling algorithm already ensures that reminders are not delivered early by not adding the reminders to the delivery queue until their delivery window has opened. The secondary task of the dynamic delivery algorithm is to ensure that the queue is as short as possible at all times, while ensuring that reminders whose delivery window has just opened, i.e. they have just become candidates for delivery, remain on time. Jobs in the queue are prioritized by their delivery urgency, defined as shown in FIG. 3.

- Jobs that are not yet late are always preferred over jobs that are late.
- For jobs that are not late, the closer to late they are, the more urgent.
- For jobs that are already late, the less late a job is, the more urgent.
- In the event of a tie, prefer the job with the smallest delivery window, i.e. the smaller lead time.

This algorithm has several distinct advantages:

- Jobs which have less accurate delivery requirements are delivered earlier, offloading the system during peak times.
- Under heavy system load, less urgent jobs may pile up in the delivery queue; they are delivered as soon as load diminishes. Even during heavy load the controller attempts to keep new jobs on time.
- As soon as load diminishes the system attempts to clear the backlog as quickly as possible.
- The length of the queue at any given time is a good barometer of the overall health of the system. Compiling a histogram of the queue length over a period of time should give a good indication of capacity requirements, volume spikes etc.

The algorithm has one less-than-ideal property, i.e. under light and normal loads, it tends to deliver reminders as early as possible, i.e. as soon as the delivery window opens, rather than as close as possible to the requested time. This is an inevitable trade-off: the harder one tries to avoid being early, the less safety margin there is and the more there is a risk of being late if anything goes wrong. The preferred bias in the reminders service is to try and confine the risk of late delivery to major hardware or software failures.

DESCRIPTION OF AN EXEMPLARY EMBODIMENT

In the presently preferred embodiment of the invention, as implemented in the AOL service, reminders are messages sent to users that notify them of upcoming calendar appointments ("events"). Users can choose how far in advance (for example, up to four weeks) reminders are sent, as well as the medium by which they are sent, e.g. email, pager, phone, or instant message.

Without reminders, users are prone to forget birthdays and other events in their calendars that are recurring or set well in advance. Thus, reminders complete the organization cycle. In the AOL service, My Calendar (see FIG. 2) is a hub for information gathering; reminders push this information back to the user. Most users check their email when they go online and benefit greatly by receiving event reminders via email. In fact, reminders are the most requested My Calendar enhancement.

Also, reminders represent a major programming opportunity for channels and their partners. The reminder backend is based on a template system that enables per event type reminder programming. This allows a user to receive, e.g. a birthday reminder that includes links to helpful gift suggestions that AOL shopping inserted into the birthday reminder template.

Example:
Your Mom's Birthday is in 2 weeks
Need a birthday gift idea?
Try Shop@AOL.

Users:
1) Users with friends and relatives who exchanges phone calls, cards, or gifts. A reminder via email several days in advance does not let them forget the event, and provides gift ideas.
2) Users with relatively few appointments. Such users are not heavily habituated to use calendars or day-timers. Reminders allow appointments to come to them, rather than users having to constantly check their calendar.
3) Users with many appointments. Reminders provide a huge measure of value by not letting users forget important events and lets them rely more on the calendar. 4) Mobile users with pagers or cellular telephones. Relatively few users are at their computer all day. Reminders, especially those sent to mobile devices such as pagers and cellular telephones, allow the user to take his calendar with him.

Reminders in My Calendar

Figure 4:
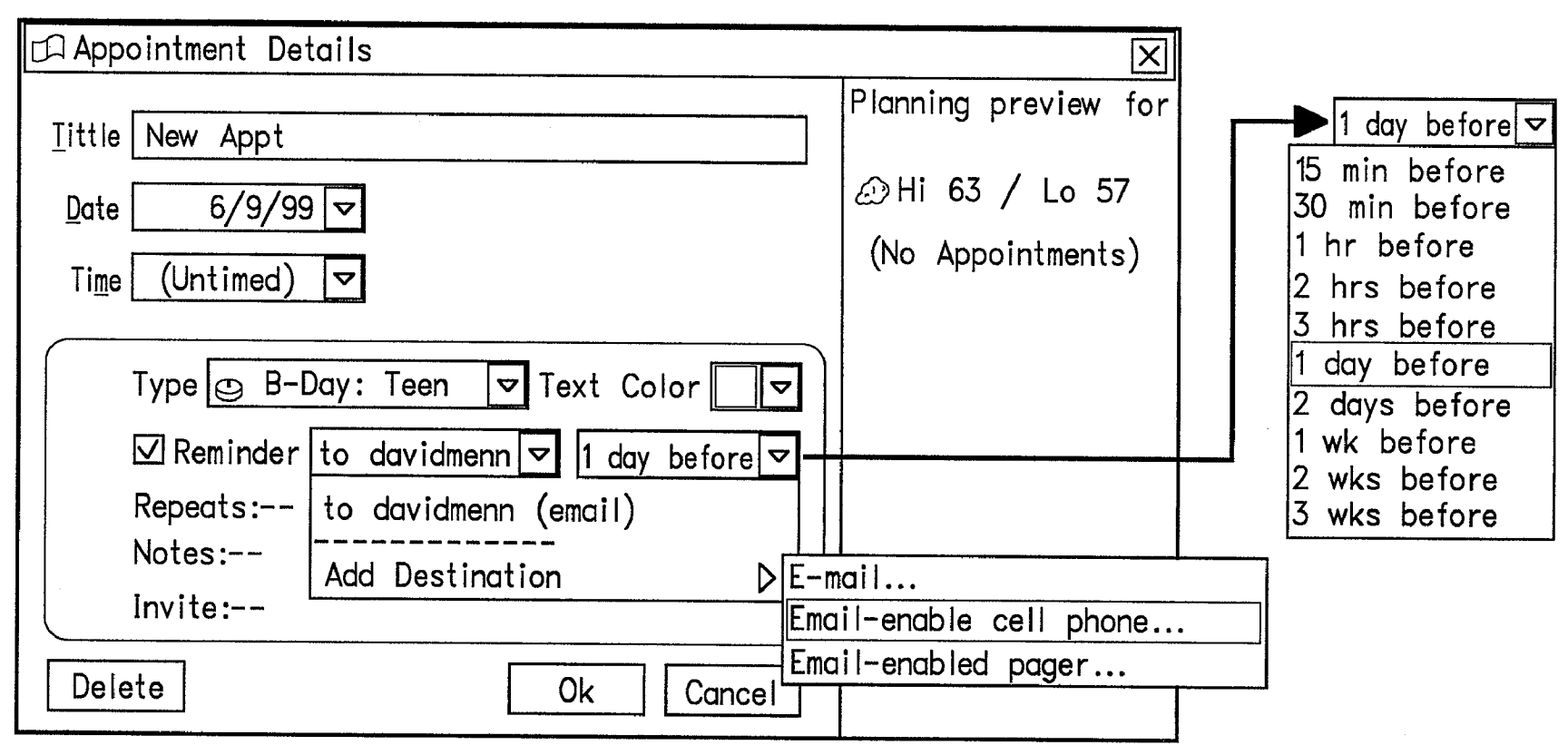

FIG. 4 is a screen display showing a reminders user interface dialog according to the invention. When a user creates or modifies an appointment, they access the appointment details dialog. From this dialog, users can choose to set a reminder. There are many possible combinations of delivery addresses and lead times for a reminder. The service allows the user to specify their default values for these properties, so that setting a reminder is as simple as checking "yes" or "no" with the default address and lead times pre-selected.

Table 1 shows the features that My Calendar provides for managing reminders:

TABLE 1

My Calendar Features

| Feature | Description |
|---|---|
| Turn Reminder on/off | Let users quickly enable a Reminder. |
| Set Lead Time | 4, 3, 2, 1 weeks; 4, 3, 2, 1 days; 12, 6, 3, 2, 1 hours; 30, 15 minutes. Lead times up to four weeks support gift events and vacation planning. Short lead times support paging and critical usage. |
| Set Delivery Method | AOL email/generic email, IM, SMS pager or cellular telephone. users must be able to send Reminders to themselves at multiple locations where they may not have Calendar access |
| Set Event Type | Reminder Templates are keyed by Event Type: Birthday, Doctor's Appointment, etc. Shopping requires additional birthday granularity: Man, Woman, Teen, Child |
| Store Preferences | Users need to create and modify delivery addresses, and to be able to specify their default delivery locations and lead times. |

Screen Name Validation

To discourage unscrupulous usage of My Calendar and reminders, users (AOL and AIM) are required to validate their screen name's default email address before they can send email. Reminders leverage the existing My Calendar mechanism for Tell A Friend to do so. This mechanism requires users to reply to an email sent to the default email address.

Reminder Error Handling

Table 2 below shows reminder error handling:

TABLE 2

Reminder Error Handling

| | |
|---|---|
| Modification of a Delivery Address | If a user modifies or deletes a Reminder delivery address that has pending Reminders, an alert must be set: "You still may have Reminders going to this address, are you sure you want to delete it?" "You should change these Reminders if you do" |
| Setting Reminders on Past Events | Disallowed. Alert user. |
| Setting Reminders with Insufficient Lead Time | Disallowed. Alert user: "You have chosen to receive a Reminder with an invalid lead time, please select another" |
| Setting Reminders when Offline | Users can use the Calendar client offline. If they set a Reminder, alert them to go online or it is not set until they sync (which could result in Lead Time/Past Event errors) |

Reminders Service Backend

The reminder service backend (see FIG. 2) is designed to be flexible, scalable, and open to future integration with other services. It has no a priori knowledge of products. It is only concerned the scheduled delivery of content to end users via several delivery mechanisms.

The major components of the backend are:
Reminder Service;
Reminder Templates;
Reminder Template Management UI;
Diagnostic UI;
Reporting; and
Meeting Performance Benchmarks.

Reminders Service

The purpose of the reminders service is to accept and store user, event, and reminder data from My Calendar. This data must capture all relevant My Calendar appointment information, including events that occur at regular intervals, e.g. weekly, monthly, every second Sunday of the month. "Notes," and "More Info."

At regular intervals, the service gathers reminders that are due, merges the user data with standard formatting information and sponsorship programming, and delivers the reminder to users:

The reminders service must account for the various types of email and message formats device platforms support and ensure proper formatting. For instance, an email reminder must translate equally well across AOL Service mail v5.0/6.0 as well as SMTP.

Table 3 below summarizes the reminders service:

TABLE 3

Reminders Service

| Feature | Description |
|---|---|
| User Data | Service, i.e. Calendar, and Brand ID User data: user name, title, address, event date and time, lead time, recurrence type, Notes, More Info Event ID: Event Type and/or Template ID |
| General Service Properties | Reminders can be added, modified, and deleted by My Calendar Reminders can be listed per user Reminders are delivered using Hermes (AIM) |
| Template Selection | Service, Co-Brand and Event Type (Template ID) are the keys that determine which Template is used per Reminder |
| Lead Times | 4, 3, 2, 1 weeks; 4, 3, 2, 1 days; 12, 6, 3, 2, 1 hours; 30, 15 minutes. |
| Addressing Options | Sent to AOL email and generic (SMTP) email addresses These are Should Have delivery addresses: Sent via IM (m2m & AIM alerts) SMS phone and pager email addresses (truncated to time & title) |
| Error Handling | Reminder Service checks for errors (in conjunction with My Calendar) including: lead time, past event. |

Reminder Templates

Reminder templates provide the flexible base of the reminder service backend. They enable the packaging of reminder user data from My Calendar into various formats for delivery (email, IM, etc.) as well as to insert programming based on event type. Without a template system, each instance of a reminder per user would have to be stored inefficiently as an entire email Table 4 below summarizes reminder templates:

TABLE 4

Reminder Templates

| Feature | Description |
|---|---|
| Format | Template information can be stored as HTML/text. Delivery type determines final formatting. |
| Components | User Data Design (event type theme, brand look) Sponsorship Programming |
| Overall Size | The average size of Template (in total) needs to be kept low to ensure high throughput. Average = 5K |
| Storage | The system should be significantly scalable; with a minimum storage of 10,000 Templates |

Figure 5:
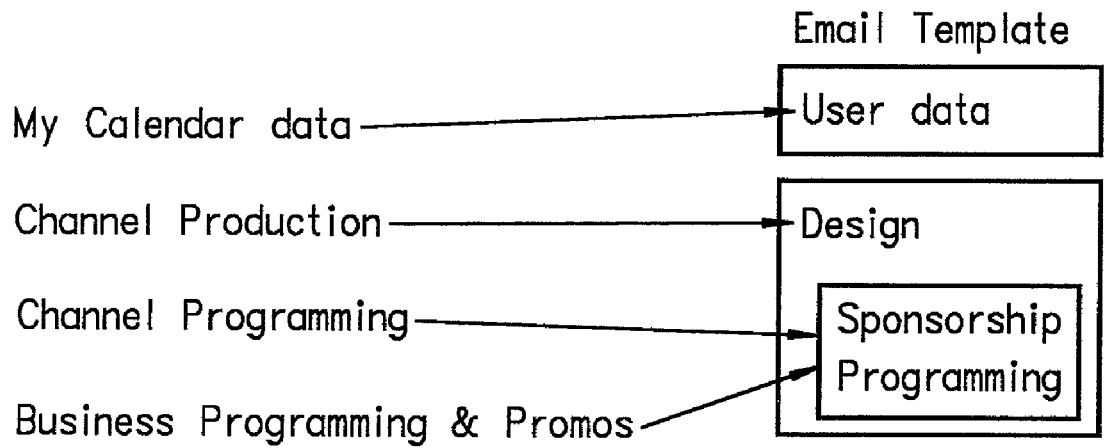
FIG. 5 is a block diagram that shows the major components that get inserted into a template according to the invention.

FIG. 5 is a block diagram that shows the major components that get inserted into a template. Note that only email templates have design and programming.

Reminder Template Types

My Calendar and All Others (Custom)

My Calendar (see FIG. 6) supports ~40 event types for appointments which map to unique reminder templates. These are hard coded and cannot be changed. All other templates are custom. These are created by channels who map a custom reminder template to a custom CTA event (discussed below).

Brand Templates

Reminders support different brands. All My Calendar event type templates are populated across each brand. Custom events may or may not (depending upon the sponsor) be duplicated across each brand. Each brand can create unique messaging and sponsorships for their event types. Sponsorships programming can also be used across brands. Current brands are: AOL, CompuServe, and Netscape.com.

International Templates

There are templates that support different languages.

Default Directory Templates

In addition to the brand templates, there is a set of My Calendar templates in a default directory. When the reminder service cannot find a specified template within a brand directory, it looks here for it before using an error template.

Error Templates

If a reminder is set that has not matching template anywhere in the reminder service, this template is used in the reminder. It does not present any error notices because, to the user none has occurred, and resembles a generic appointment template.

Template Management UI

Reminder templates must be able to be updated frequently. An HTML UI is available to business owners and channels to edit and deploy reminder templates independently of a full software release cycle. This allows the reminder templates to be continually tuned to best meet AOL's business goals. It is conceivable that there are thousands of templates to update on a daily basis.

Reminder templates are altered by logging in to an HTML interface that allows their creation, modification, and deletion. AOL business owners assign reminder templates to the appropriate AOL channel. The channel producers can then manage the sponsorship content and formatting of their reminder templates. Guidelines are used to prevent size violations and the management system is robust enough to allow multiple templates to be updated at once by a producer.

Table 5 below summarizes the template management UI:

TABLE 5

Template Management UI

| Feature | Description |
| --- | --- |
| Access | Internal URL via simple log in |
| Template Selection | List By Event Type (name), Channel, and/or Brand |
| Channel Production | Create, Modify, & Delete Template (s) |
|  | Input new body text & links |
| Business Owner | Assign Template Event Types to Channels |
|  | Create, Modify, & Delete Template (s) |
|  | Input new body text & links |
|  | Input Promo text |
| QA | Preview Template |
|  | Test Links |
|  | View Style Guide (publishing rules) |

Example Email Reminder

Table 6 below shows reminder user data from My Calendar for a birthday to be sent in email:

TABLE 6

Reminder User Data

| | |
| --- | --- |
| Service/Brand | MyCalendar/AOL |
| User | JohnMcSmith |
| Address | email: johnmcsmith1@aol.com |
| Lead Time | 1 week |

TABLE 6-continued

Reminder User Data

| | |
| --- | --- |
| Event Date | 06/02/2000 5:00 PM PST |
| Recurrence | Yearly |
| Subject | Little Sammy's Birthday |
| Notes | Remember to get Hot Wheels. |
| More Info | <none present> |
| Template ID | Birthday_Child |

Table 7 below shows stored programming content for the Template "Birthday_child:"

TABLE 7

Stored Programming Content

| | |
| --- | --- |
| Template ID | Birthday_Child |
| Channel | Need a Gift? |
| Content | Shop @ AOL's Quick Gifts delivers within 48 hours! Make sure you check out Red Envelope . . . |
| Business Content | You can also send a FREE personalized Birthday wish up to the last minute though American Greetings Shop! |

Figure 6:
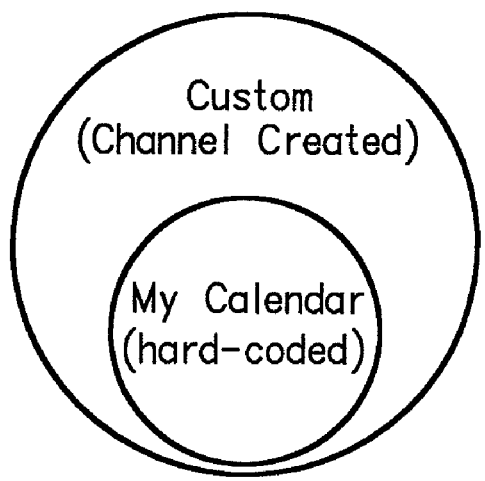
FIG. 6 is a block diagram that shows a mapping of user appointments to unique reminder templates and custom templates according to the invention.

FIG. 6 is a display that shows the resulting reminder.

Example IM and AIM (AOL Instant Messaging) Reminders

Figure 8:
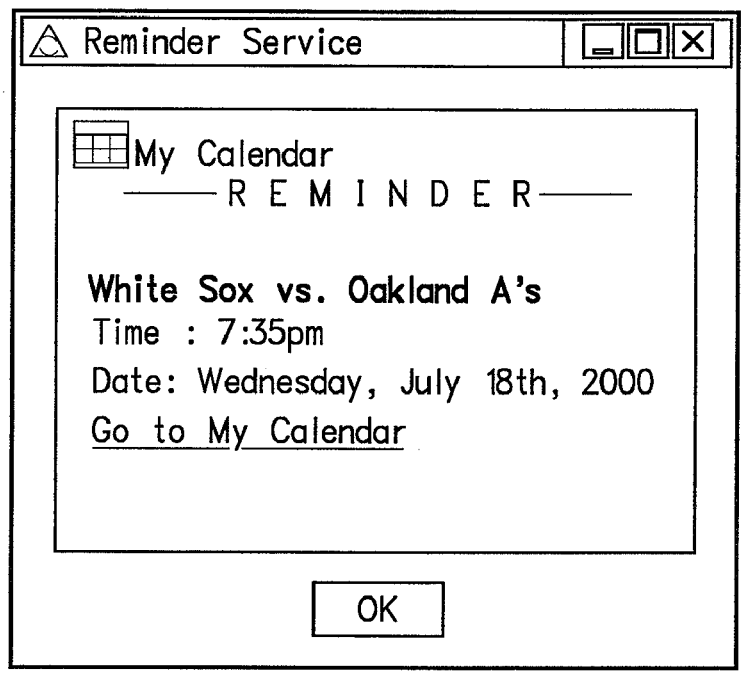
FIG. 8 shows a display that provides an example reminder sent via Instant Message according to the invention.
Figure 9:
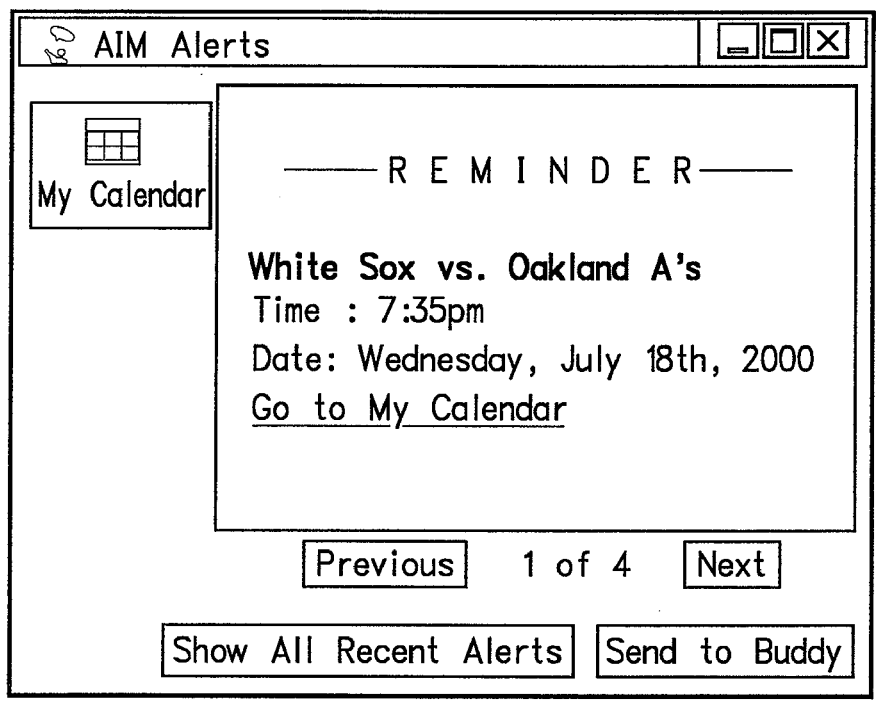
FIG. 9 shows a display that provides an example reminder sent to the AIM client as a Calendar Alert according to the invention.

FIGS. 8 and 9 show displays that provide an example reminder sent via Instant Message, as well as a reminder sent to the AIM client as a Calendar Alert. Note that event information is truncated (no channel is allowed).

Table 8 below shows the reminder user data:

TABLE 8

Reminder User Data

| | |
| --- | --- |
| Service/Brand | MyCalendar/AOL |
| User | JohnMcSmith |
| Address | Screen name: johnmcsmith |
| Lead Time | 30 minutes |
| Event Date | 07/18/2000 7:35 PM PST |
| Recurrence | None |
| Event Type | Sports <ignored> |
| Subject | White Sox vs. Oakland A's |
| Notes | Check TV guide <ignored> |
| More Info | <NA> |

Diagnostics UI

The reminder service backend requires monitoring of its vital functionality to ensure reliability. A simple HTML UI allows system administrators a snapshot of system health, and allows them to tune and reconfigure aspects of the system on the fly. Measurements provided through the UI include total uptime, error handling, service performance, and system performance.

Reporting UI

Metrics must be easily monitored for the reminders service. Business owners need easy access to per event volume as well as error tracking such as event template matching failures (where a Channel's CTA event's reminder does not get sent out). This UI is a "dash board" for general metrics, but also outputs reports for detailed reporting.

CTA (Click to Add) and Reminder Integration

Reminders are a major opportunity for business and channels. The combination of CTA and reminders allows a user to see an event of interest, click on it, and receive a reminder about it when the event is near. Channels can program links in these reminders specific to the CTA event. Because CTA can be placed only web site, this means that virtually anything can have a reminder: store sales, holidays, pregnancy planners, home maintenance, etc.

Method

Channels create the CTA that includes a key name for the reminder template using the CTA tool or scripts. The channel then creates a new reminder template in the reminder management UI with the same key name and inputs the programming.

Example

Shopping lets users set up holiday and custom events reminders from their AOL Gift Service domain. Shopping creates a series of holidays using CTA with reminder template keys in place. Users select these events, e.g. holiday: Chanukah, and the data are passed to My Calendar with the reminder. My Calendar forwards the template key to the reminder service along with other reminder user data parameters. Partners can use the reminder template management UI, to create a reminder template that maps to this key (holiday: Chanukah). When the reminder is sent to the user, it contains information appropriate to the event, e.g. Chanukah gift ideas.

Template Keys in the Calendar UI

The reminder template keys are based on My Calendar event type plus a unique ID. Because there are more event types and reminder templates possible than supported in the calendar UI, not all imported CTA event types are completely displayable (although My Calendar stores and passes them to the reminder service). For instance, if the imported event is holiday: Chanukah, only holiday is supported in the calendar UI. But, the entire key "holiday: Chanukah" is used in the reminder service to key the appropriate template. In My Calendar, users see Chanukah as the title of the event. This is more beneficial because the title is visible users at the month/day level, where the event type is not (there is also a Holiday icon).

CTA—Reminders Cycle

Figure 10:
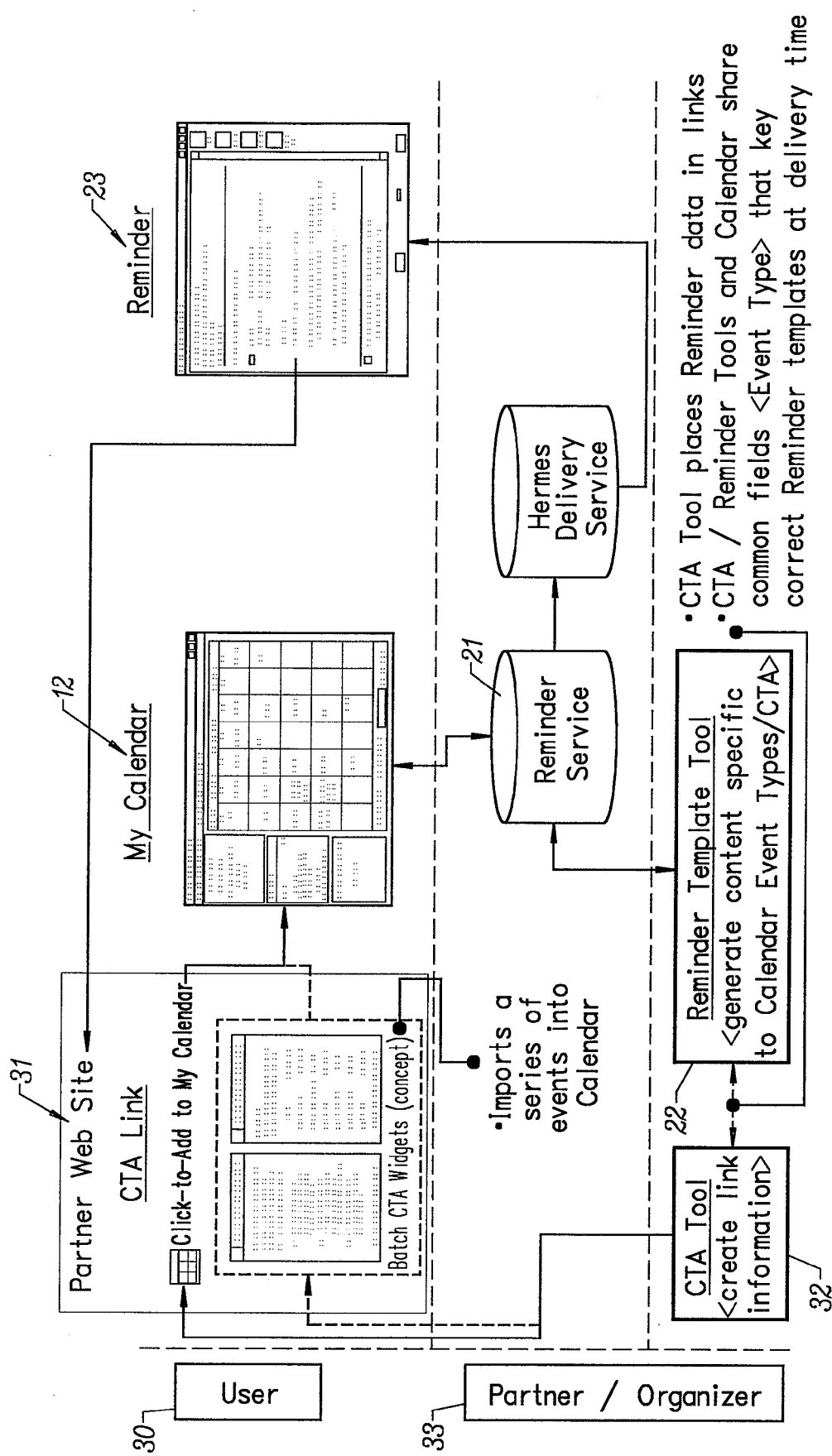
FIG. 10 is a block schematic diagram that details the workflow from single/multiple event importation into the calendar to delivery of the reminder via the service according to the invention.

FIG. 10 is a block schematic diagram that details the workflow from single/multiple event importation into the calendar to delivery of the reminder via the service. The user 30 adds the event while browsing, may or may not access the calendar, but receives reminders for the events they have imported. Links in the reminder take users to partner sites 31 where they can gather more events and/or take advantage of e-commerce opportunities. A key point in the process is the integration between the CTA tool 32 and reminder publishing tools. Partners 33 must be able to publish information that arrives at the correct reminder template easily for the event type they are creating for the calendar.

System Design
System Overview

Figure 11:
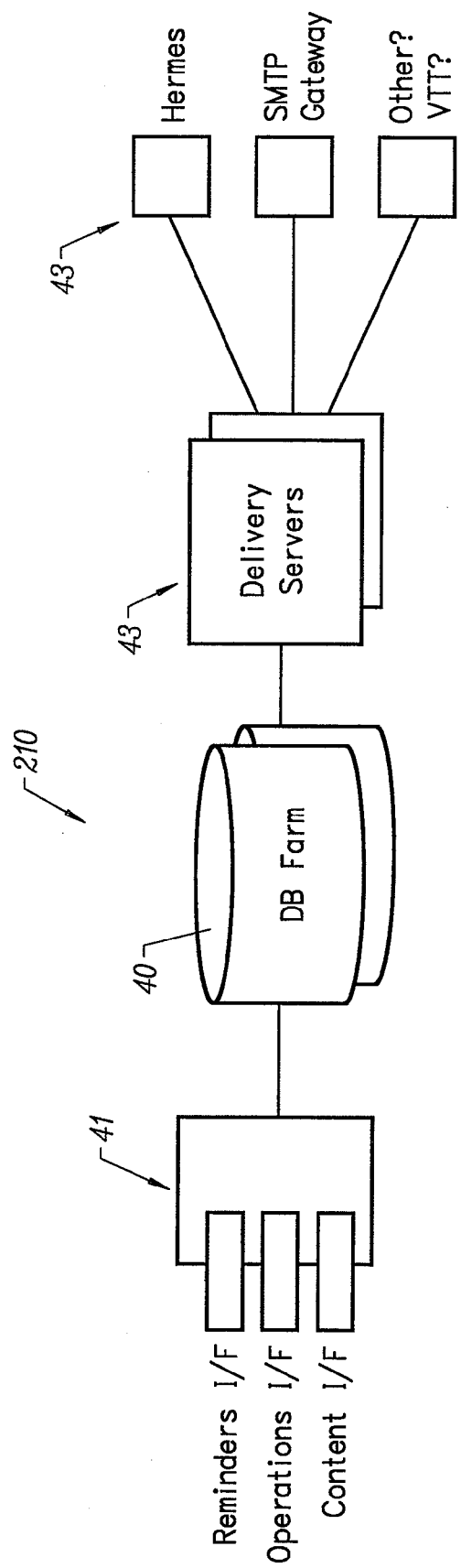
FIG. 11 is a block diagram that shows a system overview according to the invention.

One primary role of the reminders service 21 (see FIGS. 1, 2, and 10) is to queue and dequeue reminders. As such the service is composed of two independent subsystems (see FIG. 11) that access a common set of database servers. The database farm 40 provides the shared queue for the two subsystems, and stores auxiliary information such as reminder templates, commerce content, and delivery status information.

Queuing Subsystem

The queuing subsystem (210; FIG. 1) exposes an interface 41 to allow client applications to store reminders, delete stored reminders, and perform simple query operations on the status of previously queued reminders. It also exposes interfaces that allow monitoring of the system, and a publishing interface to allow third-party content providers access to the stored reminder templates and commerce content.

Dequeuing Subsystem

The dequeuing subsystem interfaces with external delivery mechanisms 43 to perform the delivery of reminders. This subsystem periodically queries the database servers for reminders that are to be delivered over a time slice or quantum. It retrieves the reminders from the database, merges the reminder content for each reminder with a predefined template file, and then delivers the reminder through the appropriate delivery mechanism. It also tracks the status of delivery of batches of reminders and stores this information back into the database.

Queuing Subsystem
Overview

Figure 12:
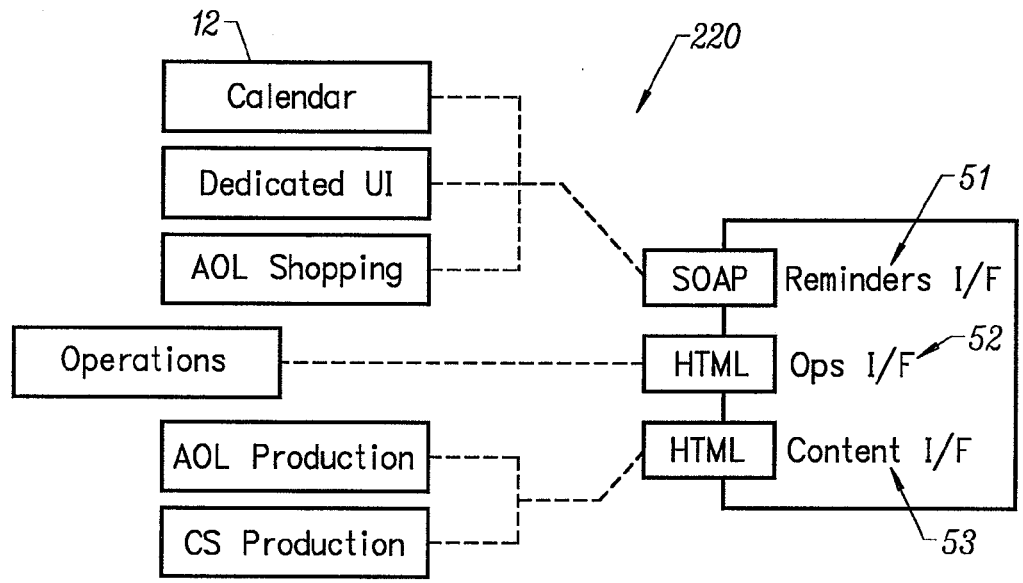
FIG. 12 is a block diagram that shows a queuing subsystem according to the invention.

The queuing subsystem 20 (see FIGS. 1 and 12) provides a set of high-level interfaces to client applications. The central reminders interface 51 is designed to be as portable and client-agnostic as possible, using a stateless XML-based request/response protocol known as Standard Object Access Protocol (SOAP) for client-neutral method invocation over HTTP.

The monitoring interface 52 is designed to be accessed by AOL operations staff. Through this interface the operations staff can check the status of any machine or process, examine error output, and perform queries and configuration of the service on the fly. A set of HTML pages provide the interface.

The content interface 53 is accessed by third-party production staff, allowing them to examine existing templates and commerce content, edit this content, and add new content. A set of HTML pages comprise this interface.

This subsystem is composed of a set of servlets running within a Netscape Enterprise Server. Each component provides specific code to service its requests and call into a common set of objects that provide common data representations and encapsulate tasks such as database access.

The queuing components are deployed across two or more physical machines to provide robustness. The servers exist in the AOL secure network and accept connections only from a list of trusted IP addresses.

Queuing Reminders

A client application invokes the queue method on the reminders interface (refer to the interface descriptions later in this document for the specific syntax). Reminders are created by merging a set of key-value pairs with an existing parameterized template. Thus, with the queue invocation the client must pass either the name of the template that is to be used to create the reminders, or must pass demographic data that allows the template to be inferred by the reminders service. The content interface to the service allows production staff to store templates into the service, and also to associate templates with demographic information. The demographic information is an integer range or a set of enumerated types associated with a data item—age between 25 and 35, or interest in sports for instance. This information is a set of enumerations that support gender, age, interest categories, and price range. The client must also provide the set of key-value pairs that are used to populate the selected template at delivery time.

The client may queue single-instance and recurring reminders through the interface. For single-instance reminders the client provides the desired delivery date/time. Recurring reminders require the client to specify the start and end date of the recurrence, the time of the reminder, and the desired recurrence pattern. The queuing process attaches a hint to each recurring reminder. The hint is based on the recurrence type of the event according to Table 9 below:

TABLE 9

Recurrence Type of Event
If number is 28, true value is 28 or 29.

| Type | Value | Description |
| --- | --- | --- |
| Daily | 0 | NO HINT |
| Weekly | bit map<br>1 = Sunday<br>2 = Monday<br>etc. | The exact day of the week on which a reminder must be sent. |
| Monthly By Day | number<br>0 = Sunday<br>1 = Monday<br>etc. | The exact days of the week on which a reminder must be sent. |
| Monthly By Date | number<br>day of month<br>Within 3 days of true value.<br>If number is 8, true value is between 8 and 11.<br>If number is 30, true value is between 30 and 2. | Earliest day of month on which reminder might be sent. |
| Yearly | number<br>month * 256 + Day<br>Within 1 day of true value.<br>If number is 4, true value is 4 or 5.<br>If number is 28, true value is 28 or 29. | Earlist month/day on which the reminder might be sent. |

Finally the client passes a 32-bit number that it uses to identify uniquely the reminder should it wish in the future to check the status, modify, or delete an existing reminder. Within the reminders service these UIDs are unique only when combined with a client application identifier, allowing different client applications to use the same scheme for UIDs without collisions.

The queuing components then select the appropriate database into which to store the reminder (see database hashing, below), and write one row into the single-occurrence or recurring reminder table as appropriate. It then returns a structured SOAP response to the client application indicating the success or failure of the operation.

Dequeuing Subsystem
Overview

Figure 13:
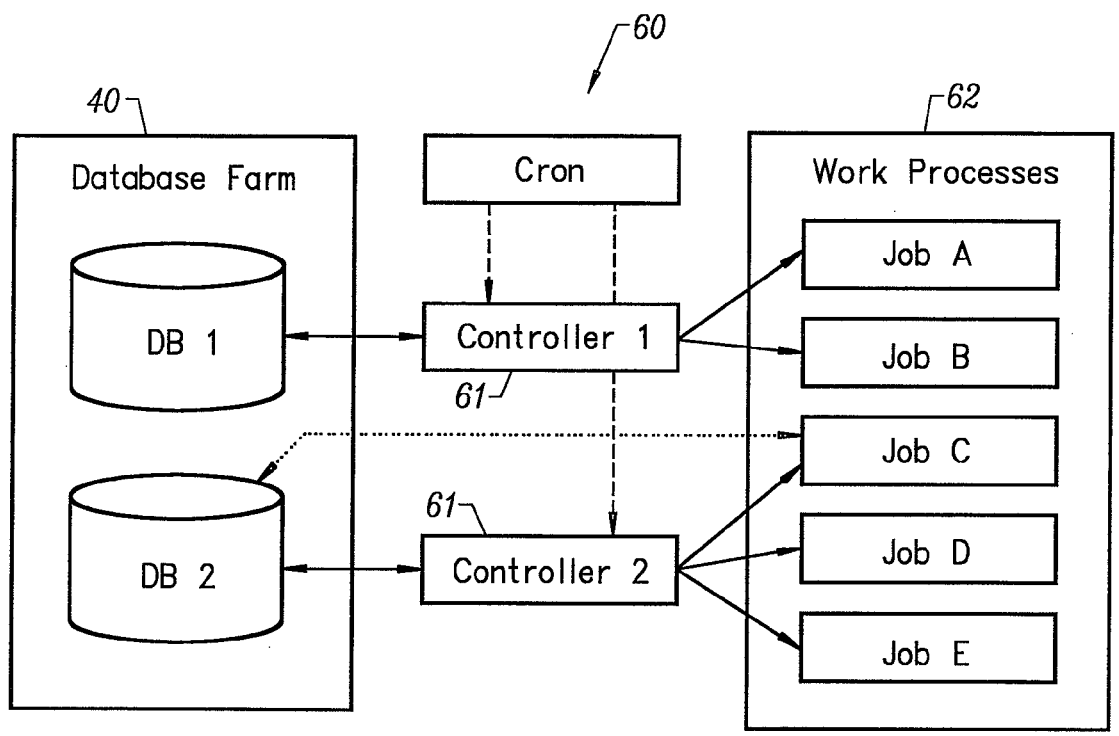
FIG. 13 is a block diagram that shows a dequeuing subsystem according to the invention.

The dequeuing subsystem 60 (see FIG. 13) is responsible for retrieving reminders from the database store 40, merging the reminder information with the correct template, and then delivering the reminder through the appropriate delivery mechanism. This subsystem is designed to be spread across as many machines as necessary to achieve the required throughput. The subsystem is comprised of two major server components, i.e. controllers 61 and work processes 62. A controller/worker architecture is chosen in this instance to allow the work processes to be distributed across many processes and physical machines without involving a complex peer-to-peer recovery system.

Figure 14:
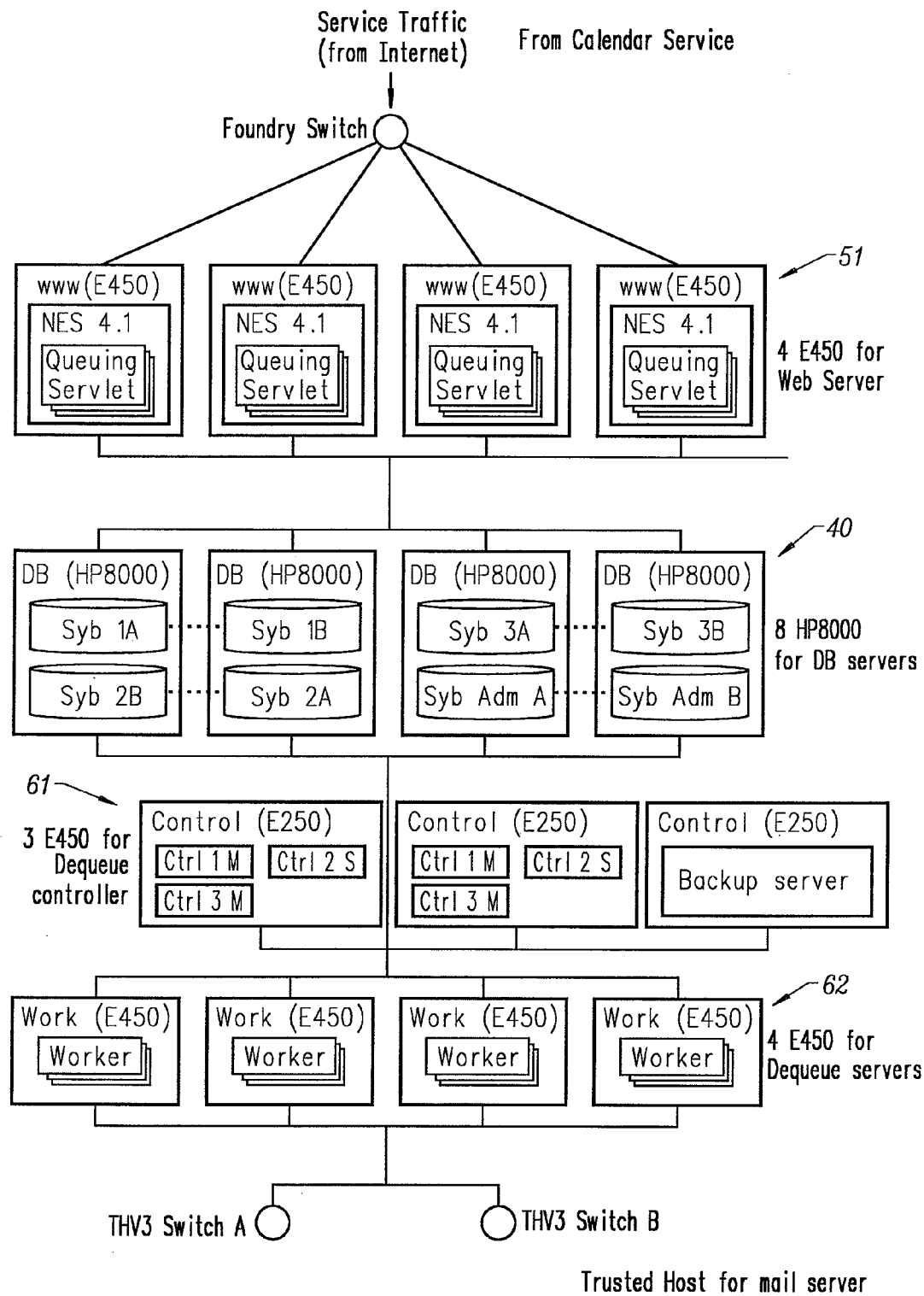
FIG. 14 is a block schematic diagram showing system deployment according to the invention.

FIG. 14 is a block schematic diagram showing system deployment according to the invention. The architecture allows the load to be evenly distributed and minimizes data loss in the event of system failure.

One controller is associated with each logical database instance. A logical database instance contains several separate physical databases that are linked using native database replication. The controller spawns worker processes locally or remotely, then monitors the progress of each worker process, restarting the processes as necessary, and/or notifying the operations staff of system failure. A service periodically monitors the controller processes, and restarts them as necessary.

When a worker process is started, the controller provides it all information it needs to process a task from a given database. The worker establishes a connection to the database, reads out the reminders that it must process, merges them with the appropriate templates, and uses the necessary delivery mechanism(s) to deliver the reminders. Once it has completed delivery of its batch of reminders, it updates the database to indicate the completion status.

Both the controllers and workers are dedicated server processes implemented in Java (can also be implemented in C). They communicate using basic sockets functionality. The controller processes hold open connections to each of their spawned worker processes while those processes are alive, to ensure the health of the worker process, and to be able to query the worker processes for status information.

Controller Process Lifecycle

Upon process startup, the controller process uses a command-line argument or environment variable to connect to the central store for all configuration information (this may be an RDBMS or an LDAP store).

The controller reads all configuration information from this store, determining which reminders database it is dedicated to, how to connect to that database, which servers are available to start worker processes on, how many processes the controller may start etc.

The controller uses the system time to determine the start of the next time quantum. One time quantum comprises five minutes, as this is the final target granularity of the service. Other time quantums may be chosen as appropriate. The controller then sleeps until the beginning of the next time quantum, e.g. if the controller is started at 8:57 am, it sleeps until 9:00 am.

When the controller wakes, it begins to prepare the delivery of notifications with a target delivery quantum of current quantum plus one. For instance, at 9:00 am, the controller starts to prepare for the delivery of reminders with a target delivery time between 9:05 and 9:10 am. It counts the number of reminders to be delivered in the time quantum, and estimates the number of work processes that are needed to deliver the reminders.

The controller adds a new entry for the worker processes in the tasks table in its database, marking these new tasks as scheduled, and noting which subset of reminders for the quantum is allocated to each worker process.

The worker processes are then started by the controller process, started on a round robin bases across the available work servers. The controller passes all necessary information to the worker process to enable it to process the reminders: database connection information, target time quantum, the range of reminders that each worker is to deliver.

The controller holds open socket/RMI connections to each of the active worker processes. The controller then sleeps, waking every minute until the start of the next time quantum to check the status of the worker processes. Every minute it ensures that all worker processes are still alive and that it can receive acknowledgement from each worker through the open network connection.

If one or more of the worker processes has failed, the controller attempts to restart the process on another machine, and/or notifies operations staff that there has been an unexpected failure. If the workers are still processing, or all workers have completed their tasks, the controller simply sleeps until the next minute and eventually until the start of the next time quantum, at which point it starts the delivery cycle again.

Once per day, according to configuration information about the lowest usage time on the service, the controller also spawns a new cleanup worker process. This is a dedicated process that bulk deletes delivered notifications from the reminders database. Deferring this deletion until off-peak hours ensures that no database writes are needed on a per-reminder basis to process a set of reminders.

Worker Process Lifecycle

Once the worker process has been started, it establishes a connection back to its owning controller process. It receives all necessary information from the controller process to deliver a batch of reminders.

The worker opens a connection to the specified database, and updates the entry in the tasks table to have the status started. It also opens connections to the delivery servers that it uses to fulfill delivery of the reminders.

The worker loads templates and commerce content from the database or from local files. It then selects the rows from the database, using the hint on recurring reminder that it needs to deliver. The database query for dequeuing recurring reminders is based on the hint, not the actual data of the event. The records returned from the query are guaranteed to be a superset of the reminders that need to be sent. The records returned by the query are then filtered by applying the true recurrence pattern to the current date to reduce the set to that which must be sent.

For each reminder the worker merges the reminder-specific data with the specified template. It then attempts to deliver the reminder.

If the worker cannot communicate with the needed delivery server, it retries the connection N times, then processes all reminders that use other delivery mechanisms. It updates the task entry in the task table to failed.

Assuming reminder delivery completes successfully, the task table entry is updated as complete. This allows the queuing interface to answer queries about the delivery status of a specific reminder—it consults the task table and infers success or failure from the overall success or failure of the task.

Finally the worker notifies the controller that it has completed, and exits.

Database Hashing

The database hashing scheme uses n number (for example, 32) logical databases, which references m (say, 16) physical databases. This means they can be actual databases, or they can be mapped onto the same physical database.

A database versioning scheme is used on the basis that it does not happen very often that operations adds new databases, and ideally this could be done without having to migrate or rebalance data between databases. The versioning adds a version identifier to each stored reminder as part of it's synthetic UID, which acts as a lookup into the version table to determine which physical database and table to examine to find the reminder. The database lookup map is read from a central store at service startup time.

Schema
 Single instance reminder:
 Event Id;
 User Id;
 Brand Id;
 Service Id;
 Delivery Day;
 Delivery Time;
 Lead Time;
 Delivery Type;
 Delivery Address;
 Template Parameters; and
 Distribution Id.

Recurring reminder:
 Event Id
 User Id
 Brand Id
 Service Id
 Start Day
 End Day
 Delivery Time
 Lead Time
 Recurrence Type
 Occurs On
 Hint
 Hint2
 Frequency
 Timezone
 DST Used
 DST Active
 UTC Offset
 Delivery Type
 Delivery Address
 Template Parameters
 Distribution Id
 Active Job Table:
 Controller Id;
 Sequential Id;
 DB Index;
 Cluster Index;
 Quantum;
 Delivery Type;
 Query Type;
 Urgency;
 Scheduled Start;
 Actual Start;
 Actual End;
 Status;
 Worker Host;
 Worker Name;
 Abort Reason;
 When Updated;
 Query Completion;
 Query In Progress;
 Distribution Id Min;
 Distribution Id Max;
 Progress;
 Created Time; and
 Schedule Count.
 Completed Job Table:
 Controller Id;
 Sequential Id;
 DB Index;
 Cluster Index;
 Quantum;
 Delivery Type;
 Query Type;
 Urgency;
 Scheduled Start;
 Actual Start;
 Actual End;
 Status
 Worker Host;
 Worker Name;
 Abort Reason;
 When Updated;
 Query Completion;
 Query In Progress;
 Distribution Id Min;
 Distribution Id Max; and Progress.
Job Queue Table
  Controller Id;
  Sequential Id;
  Delivery Type;
  Query Type;
  Distribution Id Min;
  Distribution Id Max;
  Queue Id;
  Urgency;
  Deadline;
  Est Size; and
  Created Time.
Recovery Job Table
  Controller Id;
  Sequential Id;
  DB Index;
  Cluster Index;
  From Time;
  To Time; and
  Progress.
Controller Table
  Controller Id;
  Controller Port;
  Controller Host; and
  Type.
Template Table
  Service Id;
  Brand Id;
  Template Name;
  Modify Time; and
  Template.
User/Client Feature Requirements
Calendar Reminders The present minimum granularity targets for delivery of reminders is within one day. However, the entire design and implementation strategy is focused around building a system capable of achieving a granularity of five minutes, i.e. if a reminder has been set for 9:00 am, the target delivery window is from 8:55 am-9:00 am.

The reminders service supports the full range of recurrence patterns supported by the calendar service. Because the calendar provides a rich set of these recurrence patterns, the reminders service does not support any additional patterns.
  Valid recurrence types are:
  Daily
  Weekly
  Monthly
  Yearly
  Day of Week (any or all of M/T/W/T/F/S/S)

These types can also use the modality of $n^{th}$ occurrence ("daily every other month", "M-F" every fourth week"). Also supported for "day of week" (Mon-Sun) are patterns of the modality:
  First;
  Second;
  Third;
  Fourth; and
  Last.

Users can schedule reminders through the calendar service UI. These reminders are stored by the reminders service, and users may subsequently change or cancel existing reminders. If a user edits a reminder that is within ten minutes of being delivered, their changes are not guaranteed to be reflected in the reminder. Through the calendar settings interface users may create default reminder preferences such as destination address and default delivery time(s) ("30 minutes before appointment"), to allow them to add reminders to their appointments quickly on creation. Users can also set their preferred delivery mechanisms (email/AIM/pager etc.) through this interface.

Users may also be allowed to address certain reminders to a list of attendees or interested parties. Special care must be taken to ensure that features designed for scheduled notification do not create security holes—allowing users to spam other users with email or pager messages by using the reminders service.

Batched Daily Calendar Reminders

Users of calendar receive daily notifications containing a summary of their day's appointments. Batched reminders are delivered early enough to arrive in a user's inbox or early in their day, allowing an at-a-glance look at their day. The day's batched reminder for a given user can be enqueued up to four hours before desired delivery. This means that changes to the user's calendar within this time window are not reflected in the batched reminder. The delivery of the batched reminder is expected to be accurate to within one hour, the calendar settings UI allowing the user to determine when that should be (9 am, 6 pm) etc.

This feature is mainly a function of the calendar service, and not the reminders service. It is the goal of the reminders service to expose an API that is equally useful to all clients, and that is agnostic about the specificities of any client. Developing the batched reminder feature involves periodically scanning the calendar database tables and enqueuing the day's reminder for each user in the reminders service. Because this task requires low-level knowledge of, and access to, the calendar database schema, it is logical to bundle this as calendar service functionality.

The reminders service is designed to accommodate the requirements of the batched reminders feature (quantity of text etc.), but the periodic scanning of the calendar databases and enqueuing of reminders for users is regarded as a calendar feature.

Reminders may be batched together using the following algorithm:

If multiple reminders are scheduled that have the same delivery time, refer to the same destination user, use the same reminder template, and are designated as 'batchable' (this parameter is part of the reminders service queuing API), they are combined into one reminder.

A batched reminder uses the header portion of the reminder template, then populates the body portion of the template as many times as there are reminders to be combined. Finally, the footer is appended and the reminder is delivered.

Standalone Reminders Service UI

This aspect of the invention presents an end-user interface to replace, for example, the existing AOL reminder service. The existing service provides only extremely coarse-grained delivery via email. Users may create email reminders which are delivered 14 days from the event, and optionally also four days before the event. Events may optionally recur with simple annual recurrence, and reminders are delivered at no specific time of day. Standard public holidays and occasion reminders, e.g. for Valentine's Day, are pre-created, or user may elect their own specific date for birthdays, anniversaries etc. A very small set of demographic information is also collected with each reminder (male/female, child/teen/adult) to provide targeted e-commerce links with the reminder.

The standalone reminder service UI is designed as a superset of the functionality that currently exists in the AOL reminder service. The UI is provided through an HTML UI, rather than the current FDO forms-based interface.

Reminders Service Client API

This aspect of the invention exposes a lightweight HTTP-based API to allow, for example, other AOL services the ability to post reminders into the reminders service. This API allows the enqueuing of single-occurrence and recurring notifications, and the modification and deletion of existing notifications. The client is also able to query the status of existing reminders.

The client API is a simple sessionless request/response-based API. No knowledge of client state is maintained between requests. Clients who wish to enqueue a reminder with the service make an HTTP connection, and POST a block of formatted text, e.g. a block of XML conforming to a published DTD. In this XML, the client passes pertinent data to the reminder service indicating delivery time and mechanism(s), cobrand and language requirements, demographic information (if any), and custom user data for inclusion in the reminder.

The service synchronously queues the reminder and returns a similar structured-text block indicating the result of the operation, and, on success, returns a stringified unique identifier that the client may use in later conversation with the reminders service to retrieve information about, modify, or delete an existing reminder.

Exposing an API at this high level allows for a simple yet rich conversation between the service and its clients, while making no assumptions about the client development language, deployment platform etc. Security of access to this API should be considered, although it should be pointed out this approach differs little from a standard HTTP POST to any web server exposed to the Internet at large.

Client Content Requirements

Content

Reminders are created from a set of reminder templates stored by the service. A template has a header, a body, and a footer. Templates typically store generic content that does not vary on a per-notification level—stock layout HTML for email, or stock image URLs to be included with every notification for a given cobrand. Data that vary per-reminder are passed to the reminders service as a set of key-value parameters that are substituted into the template at delivery time.

Templates are specific to a client and a cobrand for that client—for instance, "Calendar—AOL cobrand" uses different templates than the "Calendar—Compuserve cobrand". Templates also vary by delivery mechanism—shorter, text based templates may be used for pager delivery, while longer, HTML-based templates may be used for email. It is also conceivable that each set of templates would need to vary by language—English, Japanese etc. The reminders service does not limit the variety of templates that may be stored for a given client.

It is important to identify the desired template when enqueuing a notification, but a client may store an arbitrary number of templates to support the variety of user features it requires.

Templates are identified in one of two ways:
The client application may specify a template by name, and the corresponding template is then populated to generate the reminder; or
More interestingly, the client application may pass a set of enumerated demographic data (gender/age range/interest/price) that allow the service to infer which template to use based on cobrand-specific lookup tables that have been added to the service through the publishing interface (below).

Publishing Requirements

One aspect of the invention exposes a lightweight HTML-based interface to allow reminders clients to publish templates and demographic lookup tables into the reminder service. A set of simple HTML screens allow production staff to add, review and edit commerce and content data stored for their brand. This allows content to be updated on the fly without requiring a release cycle. Changes to the content should be organized and validated, but providing a high-level API should facilitate easy integration between client brands/products/service and the reminders service.

Operations Requirements

System Alerts

The reminders service must detect fatal system errors and alert operations staff as soon as possible.

Alerts should have the following properties:
Alert Generation—Alerts are to be used only for fatal system errors that require human intervention. Care must be taken to avoid spurious alert generation. It is acceptable to generate multiple alerts for the same fatal error until the error is remedied, however the number of alerts generated must be carefully controlled—it is not acceptable to generate tens or hundreds of alerts per minutes for the same fatal error;
Alert content—For the system alerts to be useful, they must contain as much specific error content as possible. All alerts should contain the following information: the name and IP address of the machine on which the alert is being generated, the name and IP address of the remote machine that could not be contacted (in case of network-related failures), the system component and/or class that is generating the alert, a detailed description of the error, all pertinent contextual information, and a list of suggestions for troubleshooting the situation.
SMTP Alert Delivery—Alerts must be delivered via email to a configurable address. Each system component must be capable of generating email alerts independently, with no reliance on other service components to perform the task.
Syslog Logging—To integrate with existing system monitoring facilities, alerts must be written to the operating system's log file ('syslog') in addition to being delivered in email. The alert content is identical to that provided in the email alert.
System Self-Monitoring—To ensure the reliable functioning of the system, constant system self-testing is required. While the alert facility described above helps ensure a rapid response to fatal system errors, self-monitoring provides a barometer of overall system health, and helps diagnose bottlenecks within, and external to, the system. Periodic self-monitoring is accomplished with two discrete subsystems—one observes the queuing functionality of the reminders service, the other monitors reminder delivery from the database through to the actual mailbox delivery.
Queue Monitoring—The queuing components run as servlets within a set of web servers, servicing HTTP POST requests to store, edit, and delete reminders. The processes are monitored as with other web services, by means of periodic HTTP requests to a special test servlet on each of the web server machines. The infrastructure to support this kind of monitoring is well-understood and common to many web services.
Very little implementation is required for the reminders service to participate—it is necessary only to implement the test servlet, document the semantics of calling the servlet, and ensure that it is installed on all web server machines that provide queuing facilities. Operations staff then configure the existing monitoring services to periodically call the test servlet on each web server.

Delivery Monitoring—The goal of all error-reporting and monitoring tools is to enable operations staff to pinpoint the precise location of the error rapidly. For the delivery of reminders this situation is complicated by the fact that failure to deliver can occur not only within the service but also external to the service, in the delivery mechanism itself. Although it is not practical to test every delivery path fully (SMTP email reminders, for instance, are relayed through many machines on the Internet at large), an awareness of the overall behavior of the delivery mechanism is critical to pinpointing problems with the system. Ideally, a bottleneck in mail servers is distinguishable from a problem within the reminders service. For this reason, the delivery monitoring facilities extend through to the endpoint of the delivery mechanism, to where the reminder reaches the user.

Additionally, within the reminders service itself there are also several parallel delivery systems, each one servicing a portion of the overall system load, i.e. one database cluster. To ensure complete monitoring of the service, each of these paths through the system must be observed, originating at the database and terminating at the point that the end user receives the reminder.

Test Reminders—The reminders service seeds each database cluster with one recurring reminder that is to be delivered every N minutes, where N is a configurable system value. This reminder is written into the database as part of the initial database setup script. The test reminder is retrieved from the database and delivered exactly as a normal reminder by the regular worker process.

The test reminder uses a dedicated test template to generate the reminder content. Within the template are special keys names that indicate to the worker process that it must embed system performance information in the reminder body.

The worker embeds the following information in each test reminder it delivers: the originating database cluster ID, the scheduled delivery date/GMT time for the reminder, the actual date/GMT time at which the reminder was passed to the delivery mechanism, the actual date/GMT time the worker process was started, and the number of reminders processed so far by the worker.

Test reminders are then delivered to the named address as with all reminders. The SMTP server that receives mail for the test destination address is hosted and must be visible to the reminders queuing web servers. It is acceptable to deliver the test mail to an existing mail server, however because the volume of mail is significant it may be simpler to provide a dedicated low-power machine as part of the reminders installation itself that runs the SMTP server receiving all test mail.

A process on the SMTP server is started periodically to harvest the test mails from the test mailbox. This process retrieves each mail. It collates information for each database cluster, detailing whether reminders were received for each quantum. Additionally it examines the arrival timestamp for each mail message, recording the delta between the time at which the reminder was handed to the delivery mechanism and the time it actually arrived in the mailbox.

Once all new mail has been examined, a summary file is written. The summary file(s) should be current to within ten minutes, i.e. the harvesting script should be run at least that often. The processed mail is then deleted from the SMTP server. The information written to the summary file must be visible from the reminers service subnet because it is integrated into the status/troubleshooting UI, as described below.

System Status UI

The system status UI provides an at-a-glance overview of the entire reminders service, and also provides administrative facilities for system maintenance. Its main purpose is to help operations staff respond to system alerts, allowing them to understand the scope of the problem quickly.

The status UI is comprised of a set of web pages served by Java servlets. Hosting the servlets on the queuing web servers is acceptable from a security standpoint because none of these machines are addressable from the Internet at large. Because the status UI allows potentially harmful actions to be taken (deleting of a user's reminders, for example), access must be tightly controlled. No authentication or access control is provided by the tool itself; the web server's built-in control lists are used to limit access by login/password or originating IP address. It may also be necessary to allow different levels of access for each page/servlet in the UI; this functionality is also provided by the web server.

The Status UI is comprised of the following components:

System Overview Page—The system overview page provides basic information about the status of each machine/process participating in the reminders service. Each time the page is loaded it displays a snapshot of the current state of the system, including the time at which the snapshot was taken. A refresh button allows the snapshot to be updated by the user. When the snapshot is taken, the servlet retrieves information on all system components as follows:

Queuing servers—An HTTP request is made to the test servlet on each web server machine. The UI shows the hostname, IP address, and port number of each process, and an icon and clearly-visible color-coding to show any failed ping attempts.

Database servers—The test servlet attempts to establish a connection to each database instance, and performs a no-op query or stored procedure execution. The UI displays the hostname, IP address, and database name or ID for each database instance. As above, the success or failure of the ping attempt is clearly visible and color coded for easy reading.

Controllers—Each controller is contacted, and queried as to its lifespan (how long that controller has been running), which master/slave it is attached to, and for the list of currently-running worker processes that the controller has. The UI then displays the hostname, IP address, and port for each running controller, its lifespan, the total number of active workers the controller is monitoring, and the length of the queue table (the controller has this information in memory). If a controller could not be contacted the failure is clearly indicated as described above.

In addition, the UI displays each worker machine, with a list of how many worker processes are active on that machine (this information is supplied by the controllers), and which workers belong to which controllers.

Add/Remove Worker Servers Page

This page is accessed from a button on the system overview page. It displays the list of work servers that are currently marked as available for the scheduling of new work. From this page the administrator can add a new worker machine by entering the hostname or IP address of the machine. The servlet attempts to contact the new work server and spawn a new process, as a sanity check to ensure that the designated machine has the correct software already installed. Assuming that this check is successful (and the machine is not a duplicate of one already in the list), each controller is contacted by the servlet and told to update its map of available servers with the new server. Once this action is complete worker process should immediately start to be scheduled on the new machine.

The administrator may also remove worker machines from service. In this case each controller is advised by the test servlet that the indicated machine may no longer be used to schedule new work. Existing work continues to run to completion on machines that are removed from the active list. Once all existing work processes have finished the administrator is free to take that worker machine offline.

Delete Reminders/User Page—Malicious use of the reminders Service cannot be entirely prevented, so it is critical that operations and/or customer care staff are able to disable user accounts quickly. This page allows the user to retrieve a count of reminders for a given screenname, a list of reminders for a screenname, and (most importantly) the ability to delete all reminders for a screenname.

Delivery Statistics Page—The delivery information that is collected by the mail harvesting process is displayed to the administrator on this page. It displays a histogram of the last 24 hours showing when mail was successfully received for each of the database clusters, and an average of the delivery latency (the time difference between handing the reminder to the delivery mechanism and its arrival into the mailbox. Depending on how much information is available, the administrator is able to page back through delivery statistics for previous days.

External Client API

Interface Protocol

The client interface is a simple, stateless HTTP request/response interaction. Clients POST an XML text block to the server, which responds with an XML text block indicating success, return values, error conditions, etc. This interface is based on the proposed Simple Object Access Protocol, aka SOAP.

Method invocation involves passing a SOAP body element with one child element that is the name of the method to be invoked. Within the method elements are a set of parameters matching the method prototype. The server then responds with a similarly structured tree of XML, returning the overall result of the method call in the first child element of the method name, which must be names "return." Any parameters that are designated as "out" parameters in the method prototype are also returned in the server response.

If the method invocation fails, the server returns a SOAP fault structure as the result of the call. This is conceptually similar to an exception being thrown by the method.

Below are examples of successful and failed method calls through SOAP:

Sample Method Invocation:

```
<SOAP-ENV:Envelope>
<SOAP-ENV:Body>
<m:CreateReminder>
<ReminderUId>98830678</ReminderUId>
<ServiceId>12</ServiceId>
<CobrandId>12</CobrandId>
<UserId>2848</UserId>
<BatchId>199</BatchId>
<TemplateParams>template=Appointment_s|user=Joe|Title=Sam's Birthday</TemplateParams>
```

-continued

```
<Day>22</Day>
<Month>7</Month>
<Year>2000</Year>
<UTm>09:00</UTm>
<LeadTime>30</LeadTime>
<RecurInfo>
<EndDate>
<Day>14</Day>
<Month>6</Month>
<Year>2001</Year>
</EndDate>
<RecurType>2</RecurType>
<Frequency>5</Frequency>
<OccursOn>5</OccursOn>
<TimeZone>8</TimeZone>
<DstUsed>1</DstUsed>
<DstActive>0</DstActive>
<UtcOffsetDays>-1<UtcOffsetDays>
<Exceptions>
155|200
</Exceptions>
</RecurInfo>
<Address>rupesh@aolscape.com</Address>
<DeliveryType>2</DeliveryType>
</m:CreateReminder>
</SOAP-ENV:Body>
</SOAP-ENV:Envelope>
```

Sample Successful Response (Returning UID of Stored Reminder):

```
HTTP/1.1 200 OK
Server: Netscape-Enterprise/4.1
Date: Sat, 22 Jul 2000 01:32:49 GMT
Content-type: text/xml; charset=ISO8859_1
Content-length: 182
<SOAP-ENV:Envelope>
<SOAP-ENV:Body>
<m:CreateReminderResponse>
<OK>
Success!Successfully created a Reminder!
</OK>
</m:CreateReminderResponse>
</SOAP-ENV:Body>
</SOAP-ENV:Envelope>
```

Sample Unsuccessful Response:

```
HTTP/1.1 500 Server Error
Server: Netscape-Enterprise/4.1
Date: Sat, 22 Jul 2000 01:43:28 GMT
Content-type: text/xml; charset=ISO8859_1
Content-length: 315
<SOAP-ENV:Envelope>
<SOAP-ENV:Body>
<SOAP-ENV:Fault>
<faultcode>Client</faultcode>
<faultstring>Invalid app data</faultstring>
<detail>
<message>Leadt time not long enough</message>
<errorcode>2013</errorcode>
<exception>Base exception</exception>
</detail>
</SOAP-ENV:Fault>
</SOAP-ENV:Body>
</SOAP-ENV:Envelope>
```

Reminders API
Recurrence Information
Enumerations:

```
enum eRecurType {
    None,
    Daily,
    Weekly,
    MonthlyByDay,
    MonthlyByDate,
    Yearly
}
enum eDayOfMonth {
    FirstMon, FirstTue, FirstWed, FirstThu, FirstFri, FirstSat,
FirstSun,
    SecondMon, SecondTue, SecondWed, SecondThu,
SecondFri, SecondSat, SecondSun,
    ThirdMon, ThirdTue, ThirdWed, ThirdThu, ThirdFri, ThirdSat,
ThirdSun,
    FourthMon, FourthTue, FourthWed, FourthThu, FourthFri,
FourthSat, FourthSun,
    LastMon, LastTue, LastWed, LastThu, LastFri, LastSat,
LastSun
}
enum eDayOfWeek {
    Sunday = 1,
    Monday = 2,
    Tuesday = 4,
    Wednesday = 8,
    Thursday = 16,
    Friday = 32,
    Saturday = 64
}
```

Compound Data Types:

```
<GMTTime>
    <Hour> integer
    <Minute> integer
</GMTTime>
<Date>
    <Day> integer
    <Month> integer
    <Year> integer
</Date>
<RecurInfo>
    <StartDate> Date
    <RecurType> eRecurType
    <EndDate> Date
    <WeeklyOccursOn> integer
    <MonthlyByDayOccursOn> eDayOfMonth
    <MonthlyByDateOccursOn> integer
    <Frequency> integer
    <Exceptions> ArrayOfDate
</RecurInfo>
```

The RecurInfo structure allows the client application to specify recurrence patterns. There are two mandatory parameters, and several optional parameters. Minimally the client must pass the StartDate and RecurType. If the RecurType is "Weekly" the client must also supply an integer OR'd set of days in the "WeeklyOccursOn" parameter. If the RecurType is "MonthlyByDate" the client must pass the "MonthlyByDateOccursOn" parameter indicating the integer day of the month. If the RecurType is "MonthlyByDay" the client must pass the "MonthlyByDayOccursOn" parameter with one of the enumerated eDayOfMonth values.

If no EndDate is passed, the recurrence pattern is assumed to be recurring with no end date. If no frequency is passed, the assumed frequency is "every". If no Exception array is passed, it is assumed that there are no exceptions to the recurrence pattern.

Examples of RecurInfo data type:
Saturday and Sunday every second week, starting on the first of February and ending at the end of March:

```
<Day>1</Day>
<Month>2</Month>
<Year>2000</Year>
<UTm>09:00</UTm>
<LeadTime>30</LeadTime><RecurInfo>
    <EndDate>
        <Day>31</Day>
        <Month>3</Month>
        <Year>2000</Year>
    </EndDate>
    <RecurType>2</RecurType>   <Frequency>1</Frequency>
<OccursOn>65</OccursOn>
<TimeZone>8</TimeZone>
<DstUsed>1</DstUsed>
<DstActive>0</DstActive>
<UtcOffsetDays>-1<UtcOffsetDays> </RecurInfo>
```

First Monday of every month during 2000, except during March:

```
<RecurInfo>
    <StartDate>
        <Day>1</Day>
        <Month>1</Month>
        <Year>2000</Year>
    </StartDate>
    <EndDate>
        <Day>31</Day>
        <Month>12</Month>
        <Year>2000</Year>
    </EndDate>
    <RecurType>MonthlyByDay</RecurType>
    <DayOfMonth>FirstMon</DayOfMonth>
    <Exceptions>
        <Date>
            <Day>6</Day>
            <Month>3</Month>
            <Year>2000</Year>
        </Date>
    </Exceptions>
</RecurInfo>
```

Creating and Editing Reminders

The CreateReminder method allows the client application to store both single occurrence and recurring reminders. The caller of the method must pass either a ReminderDate for a one-time reminder, or a RecurInfo structure to indicate the recurrence pattern and duration of a recurring reminder.

The calling application must supply a unique integer identifier that it uses to identify the reminder subsequently. It is up to the caller to ensure that the identifier is not duplicated. If a UID is passed that conflicts with an existing reminder in the system this call will throw a DuplicateUIDException.

To specify a reminder template that is used to populate the reminder body, the caller of this method must pass either the literal case-insensitive template name string, e.g. "BirthdayReminder", or must pass the DemographicData string to allow the template to be inferred by the Service.

```
boolean CreateReminder(
    [in]      Date         ReminderDate,
    [in]      RecurInfo    Recurrence,
    [in]      GMTTime      ReminderTime,
    [in]      integer      ServiceID,
```

```
        [in]      integer            ClientBrandID,
        [in]      integer            ReminderUID,
        [in]      integer            UserID,
       [[in]      string             TemplateParameters,
        [in]      string             Address
     )
     throws
        NoSuchTemplateException,
        MissingParameterException,
        InvalidParameterException,
        ParseException,
        TooLateException,
        DuplicateUIDException;
```

Changing an existing reminder involves a similar method call, with the majority of parameters functioning identically to the CreateReminder call above. In this case however the UID that is passed to the Reminder Service must already exist—if it does not exist the method call throws a NoSuchUIDException when the call is submitted.

If the desired behavior is to update the existing reminder or create a new reminder on the fly the client may pass the UpdateOrCreate flag, in which case the reminder will be dynamically created if it does not exist, rather than an exception being thrown.

The other method parameters follow the same conventions as the CreateReminder method.

```
     boolean UpdateReminder(
        [in] boolean UpdateOrCreate,
        [in] Date ReminderDate,
        [in] RecurInfo Recurrence,
        [in] GMTTime ReminderTime,
        [in] integer ServiceID,
        [in] integer ClientBrandID,
        [in] integer ReminderUID,
        [in] integer UserId, [in] string TemplateParameters,
        [in] string Address
     )
     throws
        NoSuchUIDException,
        NoSuchTemplateException,
        MissingParameterException,
        InvalidParameterException,
        ParseException,
        TooLateException;
```

Reminders may be removed from the system by calling the DeleteReminder method, passing the UID of the existing reminder. If the reminder UID cannot be located, the method returns false but no exception is thrown.

```
     boolean DeleteReminder(
        [in] integer ReminderUID,
        [in] integer ServiceID,
        [in] integer ClientBrandID,
        [in] integer UserId,
     )
     throws
        MissingParameterException,
        InvalidParameterException,
        ParseException;
```

Querying on Reminders

```
     enum eDeliveryStatus {
        Waiting,
        InProcess,
        Delivered,
        Failed
     }
     eDeliveryStatus GetDeliveryStatus(
        [in] integer ReminderUID,
     )
     throws
        NoSuchUIDException,
        MissingParameterException,
        InvalidParameterException,
        ParseException;
     boolean ReminderExists(
        [in] integer ReminderUID,
     )
     throws
        MissingParameterException,
        InvalidParameterException,
        ParseException;
     boolean GetReminder(
        [in] integer ReminderUID,
        [in] integer ServiceID,
        [in] integer ClientBrandID,
        [in] integer UserId
        [out] Date ReminderDate,
        [out] RecurInfo Recurrence,
        [out] GMTTime ReminderTime,
        [out] integer ServiceID,
        [out] integer ClientBrandID,
        [out] integer ReminderUID,
        [[out] string TemplateParameters,
        [out] string Address
     )
     throws
        MissingParameterException,
        InvalidParameterException,
        ParseException;
```

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus for optimizing recurring database reminders, comprising:

a controller comprising a processor operatively coupled with a memory, said controller configured for providing a reminders service for storing recurring reminders, wherein said reminders service stores a probability hint along with event data with each recurring reminder, wherein each said probability hint further comprising a hint value that is specific to each recurrence type;

wherein said controller is further configured for queuing and dequeuing recurring reminders based only on said hint value rather than said event data itself;

wherein said hint optimizes, by ignoring said event data, a number of recurring queries that must be accessed to find all reminders to be sent during a time period.

2. A method for optimizing recurring database queries, comprising the steps of:

providing a reminders service for storing recurring queries reminders;

storing a probability hint along with event data with each recurring reminder, wherein each said probability hint further comprising a hint value that is specific to each recurrence type;

queuing and dequeuing recurring reminders based only on said hint value rather than said event data itself, such that said hint optimizes a number of recurring queries that must be accessed to find all reminders to be sent during a time period.

* * * * *